United States Patent
Adams et al.

(10) Patent No.: US 9,477,844 B2
(45) Date of Patent: *Oct. 25, 2016

(54) CONTEXT-BASED SECURITY SCREENING FOR ACCESSING DATA

(71) Applicant: INTERNATIONAL BUSINESS MACHINES CORPORATION, Armonk, NY (US)

(72) Inventors: Samuel S. Adams, Rutherfordton, NC (US); Robert R. Friedlander, Southbury, CT (US); James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 156 days.

This patent is subject to a terminal disclaimer.

(21) Appl. No.: 14/526,103

(22) Filed: Oct. 28, 2014

(65) Prior Publication Data

US 2015/0047057 A1 Feb. 12, 2015

Related U.S. Application Data

(63) Continuation of application No. 13/680,832, filed on Nov. 19, 2012, now Pat. No. 8,931,109.

(51) Int. Cl.
*G06F 21/62* (2013.01)

(52) U.S. Cl.
CPC .... *G06F 21/6218* (2013.01); *G06F 2221/2111* (2013.01)

(58) Field of Classification Search
CPC .................... G06F 21/6218; G06F 2221/2111
See application file for complete search history.

(56) References Cited

U.S. PATENT DOCUMENTS

| 5,450,535 A | 9/1995 | North |
| 5,664,179 A | 9/1997 | Tucker |

(Continued)

FOREIGN PATENT DOCUMENTS

| CN | 101866342 A | 10/2010 |
| CN | 102201043 | 9/2011 |

(Continued)

OTHER PUBLICATIONS

U.S. Appl. No. 13/755,987—Non-Final Office Action mailed Jan. 2, 2015.

(Continued)

*Primary Examiner* — Darren B Schwartz
(74) *Attorney, Agent, or Firm* — John R. Pivnichny; Law Office of Jim Boice

(57) ABSTRACT

A processor-implemented method, system, and/or computer program product securely accesses a specific data store. A non-contextual data object is associated with a context object to define a first synthetic context-based object. The non-contextual data object ambiguously describes multiple types of persons, and the context object provides a circumstantial context that identifies a specific type of person from the multiple types of persons. The first synthetic context-based object is associated with at least one specific data store in a data structure. A string of binary data that describes a requester of data, including a time window for receipt and security level of the requester, is received by a security module for generating a new synthetic context-based object. If there is a match between the new synthetic context-based object, the first synthetic context-based object, and the security level of the requester, then the data is returned to the requester.

20 Claims, 15 Drawing Sheets

(56) References Cited

U.S. PATENT DOCUMENTS

| | | |
|---|---|---|
| 5,689,620 A | 11/1997 | Kopec et al. |
| 5,701,460 A | 12/1997 | Kaplan et al. |
| 5,943,663 A | 8/1999 | Mouradian |
| 5,974,427 A | 10/1999 | Reiter |
| 6,199,064 B1 | 3/2001 | Schindler |
| 6,275,833 B1 | 8/2001 | Nakamura et al. |
| 6,314,555 B1 | 11/2001 | Ndumu et al. |
| 6,334,156 B1 | 12/2001 | Matsuoka et al. |
| 6,381,611 B1 | 4/2002 | Roberge et al. |
| 6,405,162 B1 | 6/2002 | Segond et al. |
| 6,424,969 B1 | 7/2002 | Gruenwald |
| 6,553,371 B2 | 4/2003 | Gutierrez-Rivas et al. |
| 6,633,868 B1 | 10/2003 | Min et al. |
| 6,735,593 B1 | 5/2004 | Williams |
| 6,768,986 B2 | 7/2004 | Cras et al. |
| 6,925,470 B1 | 8/2005 | Sangudi et al. |
| 6,990,480 B1 | 1/2006 | Burt |
| 7,058,628 B1 | 6/2006 | Page |
| 7,103,836 B1 | 9/2006 | Nakamura et al. |
| 7,209,923 B1 | 4/2007 | Cooper |
| 7,337,174 B1 | 2/2008 | Craig |
| 7,441,264 B2 | 10/2008 | Himmel et al. |
| 7,493,253 B1 | 2/2009 | Ceusters et al. |
| 7,523,118 B2 | 4/2009 | Friedlander et al. |
| 7,523,123 B2 | 4/2009 | Yang et al. |
| 7,571,163 B2 | 8/2009 | Trask |
| 7,702,605 B2 | 4/2010 | Friedlander et al. |
| 7,748,036 B2 | 6/2010 | Speirs, III et al. |
| 7,752,154 B2 | 7/2010 | Friedlander et al. |
| 7,778,955 B2 | 8/2010 | Kuji |
| 7,783,586 B2 | 8/2010 | Friedlander et al. |
| 7,788,202 B2 | 8/2010 | Friedlander et al. |
| 7,788,203 B2 | 8/2010 | Friedlander et al. |
| 7,792,774 B2 | 9/2010 | Friedlander et al. |
| 7,792,776 B2 | 9/2010 | Friedlander et al. |
| 7,792,783 B2 | 9/2010 | Friedlander et al. |
| 7,797,319 B2 | 9/2010 | Piedmonte |
| 7,805,390 B2 | 9/2010 | Friedlander et al. |
| 7,805,391 B2 | 9/2010 | Friedlander et al. |
| 7,809,660 B2 | 10/2010 | Friedlander et al. |
| 7,853,611 B2 | 12/2010 | Friedlander et al. |
| 7,870,113 B2 | 1/2011 | Gruenwald |
| 7,877,682 B2 | 1/2011 | Aegerter |
| 7,925,610 B2 | 4/2011 | Elbaz et al. |
| 7,930,262 B2 | 4/2011 | Friedlander et al. |
| 7,940,959 B2 | 5/2011 | Rubenstein |
| 7,953,686 B2 | 5/2011 | Friedlander et al. |
| 7,970,759 B2 | 6/2011 | Friedlander et al. |
| 7,996,373 B1 | 8/2011 | Zoppas et al. |
| 7,996,393 B1 | 8/2011 | Nanno et al. |
| 8,032,508 B2 | 10/2011 | Martinez et al. |
| 8,046,358 B2 | 10/2011 | Thattil |
| 8,055,603 B2 | 11/2011 | Angell et al. |
| 8,069,188 B2 | 11/2011 | Larson et al. |
| 8,086,614 B2 | 12/2011 | Novy |
| 8,095,726 B1 | 1/2012 | O'Connell et al. |
| 8,145,582 B2 | 3/2012 | Angell et al. |
| 8,150,882 B2 | 4/2012 | Meek et al. |
| 8,155,382 B2 | 4/2012 | Rubenstein |
| 8,161,048 B2 | 4/2012 | Procopiuc et al. |
| 8,199,982 B2 | 6/2012 | Fueyo et al. |
| 8,234,285 B1 | 7/2012 | Cohen |
| 8,250,581 B1 | 8/2012 | Blanding et al. |
| 8,341,626 B1 | 12/2012 | Gardner et al. |
| 8,447,273 B1 | 5/2013 | Friedlander et al. |
| 8,457,355 B2 | 6/2013 | Brown et al. |
| 8,620,958 B1 | 12/2013 | Adams et al. |
| 8,799,323 B2 | 8/2014 | Nevin, III |
| 8,849,907 B1 | 9/2014 | Hession et al. |
| 2002/0091677 A1 | 7/2002 | Sridhar |
| 2002/0111792 A1 | 8/2002 | Cherny |
| 2002/0184401 A1 | 12/2002 | Kadel et al. |
| 2003/0065626 A1 | 4/2003 | Allen |
| 2003/0088576 A1 | 5/2003 | Hattori et al. |
| 2003/0149562 A1 | 8/2003 | Walther |
| 2003/0149934 A1 | 8/2003 | Worden |
| 2003/0212851 A1 | 11/2003 | Drescher et al. |
| 2004/0111410 A1 | 6/2004 | Burgoon et al. |
| 2004/0153461 A1 | 8/2004 | Brown et al. |
| 2004/0162838 A1 | 8/2004 | Murayama et al. |
| 2004/0249789 A1 | 12/2004 | Kapoor et al. |
| 2005/0050030 A1 | 3/2005 | Gudbjartsson et al. |
| 2005/0165866 A1 | 7/2005 | Bohannon et al. |
| 2005/0181350 A1 | 8/2005 | Benja-Athon |
| 2005/0222890 A1 | 10/2005 | Cheng et al. |
| 2005/0273730 A1 | 12/2005 | Card et al. |
| 2006/0004851 A1 | 1/2006 | Gold et al. |
| 2006/0036568 A1 | 2/2006 | Moore et al. |
| 2006/0190195 A1 | 8/2006 | Watanabe et al. |
| 2006/0197762 A1 | 9/2006 | Smith et al. |
| 2006/0200253 A1 | 9/2006 | Hoffberg et al. |
| 2006/0256010 A1 | 11/2006 | Tanygin et al. |
| 2006/0271586 A1 | 11/2006 | Federighi et al. |
| 2006/0290697 A1 | 12/2006 | Madden et al. |
| 2007/0006321 A1 | 1/2007 | Bantz et al. |
| 2007/0016614 A1 | 1/2007 | Novy |
| 2007/0038651 A1 | 2/2007 | Bernstein et al. |
| 2007/0067343 A1 | 3/2007 | Mihaila et al. |
| 2007/0073734 A1 | 3/2007 | Doan et al. |
| 2007/0079356 A1 | 4/2007 | Grinstein |
| 2007/0088663 A1 | 4/2007 | Donahue |
| 2007/0130182 A1 | 6/2007 | Forney |
| 2007/0136048 A1 | 6/2007 | Richardson-Bunbury et al. |
| 2007/0185850 A1 | 8/2007 | Walters et al. |
| 2007/0239710 A1 | 10/2007 | Jing et al. |
| 2007/0282916 A1 | 12/2007 | Albahari et al. |
| 2007/0300077 A1 | 12/2007 | Mani et al. |
| 2008/0065655 A1 | 3/2008 | Chakravarthy et al. |
| 2008/0066175 A1 | 3/2008 | Dillaway et al. |
| 2008/0086442 A1 | 4/2008 | Dasdan et al. |
| 2008/0091503 A1 | 4/2008 | Schirmer et al. |
| 2008/0133474 A1 | 6/2008 | Hsiao et al. |
| 2008/0147780 A1 | 6/2008 | Trevor et al. |
| 2008/0159317 A1 | 7/2008 | Iselborn et al. |
| 2008/0172715 A1 | 7/2008 | Geiger et al. |
| 2008/0208813 A1 | 8/2008 | Friedlander et al. |
| 2008/0208838 A1 | 8/2008 | Friedlander et al. |
| 2008/0208901 A1 | 8/2008 | Friedlander et al. |
| 2008/0281801 A1 | 11/2008 | Larson et al. |
| 2008/0306926 A1 | 12/2008 | Friedlander et al. |
| 2009/0024553 A1 | 1/2009 | Angell et al. |
| 2009/0064300 A1 | 3/2009 | Bagepalli et al. |
| 2009/0080408 A1 | 3/2009 | Natoli et al. |
| 2009/0125546 A1 | 5/2009 | Iborra et al. |
| 2009/0144609 A1 | 6/2009 | Liang et al. |
| 2009/0164649 A1 | 6/2009 | Kawato |
| 2009/0165110 A1 | 6/2009 | Becker et al. |
| 2009/0177484 A1 | 7/2009 | Davis et al. |
| 2009/0182707 A1 | 7/2009 | Kinyon et al. |
| 2009/0287676 A1 | 11/2009 | Dasdan |
| 2009/0299988 A1 | 12/2009 | Hamilton, II et al. |
| 2009/0327632 A1 | 12/2009 | Glaizel et al. |
| 2010/0030780 A1 | 2/2010 | Eshghi et al. |
| 2010/0070640 A1 | 3/2010 | Allen et al. |
| 2010/0077033 A1 | 3/2010 | Lowry |
| 2010/0088322 A1 | 4/2010 | Chowdhury et al. |
| 2010/0131293 A1 | 5/2010 | Linthicum et al. |
| 2010/0169137 A1 | 7/2010 | Jastrebski et al. |
| 2010/0169758 A1 | 7/2010 | Thomsen |
| 2010/0174692 A1 | 7/2010 | Meyer et al. |
| 2010/0179933 A1 | 7/2010 | Bai et al. |
| 2010/0191743 A1 | 7/2010 | Perronnin et al. |
| 2010/0191747 A1 | 7/2010 | Ji et al. |
| 2010/0241644 A1 | 9/2010 | Jackson et al. |
| 2010/0257198 A1 | 10/2010 | Cohen et al. |
| 2010/0268747 A1 | 10/2010 | Kern et al. |
| 2010/0274785 A1 | 10/2010 | Procopiuc et al. |
| 2011/0040724 A1 | 2/2011 | Dircz |
| 2011/0066649 A1 | 3/2011 | Berlyant et al. |
| 2011/0077048 A1 | 3/2011 | Busch |
| 2011/0087678 A1 | 4/2011 | Frieden et al. |
| 2011/0093479 A1 | 4/2011 | Fuchs |
| 2011/0098056 A1 | 4/2011 | Rhoads et al. |
| 2011/0123087 A1 | 5/2011 | Nie et al. |

(56) References Cited

U.S. PATENT DOCUMENTS

| | | |
|---|---|---|
| 2011/0137882 A1 | 6/2011 | Weerasinghe |
| 2011/0194744 A1 | 8/2011 | Wang et al. |
| 2011/0208688 A1 | 8/2011 | Ivanov et al. |
| 2011/0246483 A1 | 10/2011 | Darr et al. |
| 2011/0246498 A1 | 10/2011 | Forster |
| 2011/0252045 A1 | 10/2011 | Garg et al. |
| 2011/0282888 A1 | 11/2011 | Koperski et al. |
| 2011/0299427 A1 | 12/2011 | Chu et al. |
| 2011/0301967 A1 | 12/2011 | Friedlander et al. |
| 2011/0314155 A1 | 12/2011 | Narayanaswamy et al. |
| 2012/0004891 A1 | 1/2012 | Rameau et al. |
| 2012/0005239 A1 | 1/2012 | Nevin, III |
| 2012/0016715 A1 | 1/2012 | Brown et al. |
| 2012/0023141 A1 | 1/2012 | Holster |
| 2012/0072468 A1 | 3/2012 | Anthony et al. |
| 2012/0079493 A1 | 3/2012 | Friedlander et al. |
| 2012/0109640 A1 | 5/2012 | Anisimovich et al. |
| 2012/0110004 A1 | 5/2012 | Meijer |
| 2012/0110016 A1 | 5/2012 | Phillips |
| 2012/0131139 A1 | 5/2012 | Siripurapu et al. |
| 2012/0131468 A1 | 5/2012 | Friedlander et al. |
| 2012/0166373 A1 | 6/2012 | Sweeney et al. |
| 2012/0191704 A1 | 7/2012 | Jones |
| 2012/0209858 A1 | 8/2012 | Lambda et al. |
| 2012/0221439 A1 | 8/2012 | Sundaresan et al. |
| 2012/0233194 A1 | 9/2012 | Ohyu et al. |
| 2012/0239761 A1 | 9/2012 | Linner et al. |
| 2012/0240080 A1 | 9/2012 | O'Malley |
| 2012/0246148 A1 | 9/2012 | Dror |
| 2012/0259841 A1 | 10/2012 | Hsiao et al. |
| 2012/0278897 A1 | 11/2012 | Ang et al. |
| 2012/0281830 A1 | 11/2012 | Stewart et al. |
| 2012/0290950 A1 | 11/2012 | Rapaport et al. |
| 2012/0297278 A1 | 11/2012 | Gattani et al. |
| 2012/0311587 A1 | 12/2012 | Li et al. |
| 2012/0316821 A1 | 12/2012 | Levermore et al. |
| 2012/0330958 A1 | 12/2012 | Xu et al. |
| 2013/0019084 A1 | 1/2013 | Orchard et al. |
| 2013/0031302 A1 | 1/2013 | Byom et al. |
| 2013/0060696 A1 | 3/2013 | Martin et al. |
| 2013/0103389 A1 | 4/2013 | Gattani et al. |
| 2013/0124564 A1 | 5/2013 | Oztekin et al. |
| 2013/0173292 A1 | 7/2013 | Friedlander et al. |
| 2013/0191392 A1 | 7/2013 | Kumar et al. |
| 2013/0238667 A1 | 9/2013 | Carvalho et al. |
| 2013/0246562 A1 | 9/2013 | Chong et al. |
| 2013/0254202 A1 | 9/2013 | Friedlander et al. |
| 2013/0291098 A1 | 10/2013 | Chung et al. |
| 2013/0311473 A1 | 11/2013 | Safovich et al. |
| 2013/0326412 A1 | 12/2013 | Treiser |
| 2013/0339379 A1 | 12/2013 | Ferrari et al. |
| 2014/0006411 A1 | 1/2014 | Boldyrev et al. |
| 2014/0012884 A1 | 1/2014 | Bornea et al. |
| 2014/0025702 A1 | 1/2014 | Curtiss et al. |
| 2014/0074833 A1 | 3/2014 | Adams et al. |
| 2014/0074885 A1 | 3/2014 | Adams et al. |
| 2014/0074886 A1 | 3/2014 | Medelyan et al. |
| 2014/0074892 A1 | 3/2014 | Adams et al. |
| 2014/0081939 A1 | 3/2014 | Adams et al. |
| 2014/0090049 A1 | 3/2014 | Friedlander et al. |
| 2014/0098101 A1 | 4/2014 | Friedlander et al. |
| 2014/0214865 A1 | 7/2014 | Adams et al. |
| 2014/0214871 A1 | 7/2014 | Adams et al. |
| 2014/0250111 A1 | 9/2014 | Morton et al. |
| 2014/0344718 A1 | 11/2014 | Rapaport et al. |

FOREIGN PATENT DOCUMENTS

| | | |
|---|---|---|
| CN | 102236701 | 11/2011 |
| CN | 102385483 A | 3/2012 |
| EP | 1566752 A2 | 8/2005 |
| EP | 1843259 A2 | 10/2007 |
| WO | 2006086179 A2 | 8/2006 |
| WO | 2007044763 A2 | 4/2007 |

OTHER PUBLICATIONS

U.S. Appl. No. 13/648,801—Final Office Action mailed Jan. 13, 2015.

G. Begelman et al., "Automated Tag Clustering: Improving Search and Exploration in the TagSpace", Collaborative Tagging Workshop, WWW2006, Edinburgh, Scotland, May 2006, pp. 1-29.

U.S. Appl. No. 13/621,931—Non-Final Office Action mailed Jan. 28, 2015.

U.S. Appl. No. 13/732,567—Non-Final Office Action mailed Jan. 30, 2015.

U.S. Appl. No. 14/078,135—Notice of Allowance mailed Feb. 24, 2015.

U.S. Appl. No. 13/756,051—Notice of Allowance mailed Feb. 27, 2015.

U.S. Appl. No. 13/732,567—Non-Final Office Action mailed Mar. 26, 2015.

L. Du et al., "A Unified Object-Oriented Toolkit for Discrete Contextual Computer Vision", IEEE, IEEE Colloquium on Pattern Recognition, Feb. 1997, pp. 3/1-3/5. (Abstract Only).

S. Ceri et al., "Model-Driven Development of Context-Aware Web Applications", ACM, ACM Transactions on Internet Technology, 2007, (Abstract Only).

U.S. Appl. No. 13/861,058 Non-Final Office Action Mailed Apr. 25, 2016.

U.S. Appl. No. 13/610,523—Non-Final Office Action mailed Apr. 30, 2015.

U.S. Appl. No. 13/540,267—Non-Final Office Action mailed Jun. 4, 2015.

U.S. Appl. No. 13/609,710—Examiner's Answer mailed Jun. 9, 2015.

U.S. Appl. No. 13/780,779—Non-Final Office Action mailed Apr. 3, 2015.

U.S. Appl. 13/896,461—Non-Final Office Action mailed Apr. 21, 2015.

U.S. Appl. No. 13/569,366—Non-Final Office Action mailed Jun. 30, 2015.

Faulkner, Paul, "Common Patterns for Synthetic Events in Websphere Business Events," Jan. 15, 2011, http://www.ibm.com/developerworks/websphere/bpmjournal/1101_faulkner2/1101_faulkner2.html, pp. 1-6.

Evaggelio Pitoura et al., "Context in Databases", University of Ioannina, Greece, 2004, pp. 1-19.

Avinash Kaushik, "End of Dumb Tables in Web Analytics Tools! Hello: Weighted Sort", Sep. 7, 2010, www.kaushik.net, pp. 1-15.

Lorenzo Alberton, "Graphs in the Database: SQL Meets Social Networks," Techportal, Sep. 7, 2009, http://techportal.inviqa.com/2009/09/07/graphs-in-the-database-sql-meets-social-networks/, pp. 1-11.

Visual Paradigm, "DB Visual Architect 4.0 Designer's Guide: Chapter 6—Mapping Object Model to Data Model and Vice Versa", 2007, pp. 6-2-6-26.

Anonymous "Fraud Detection Using Data Analytics in the Banking Industry," ACL Services Ltd., 2010, pp. 1-9 <http://www.acl.com/pdfs/DP_Fraud_detection_BANKING.pdf>.

W. Caid et al., "Context Vector-Based Text Retrieval", Fair Isaac Corporation, Aug. 2003, pp. 1-20.

K. Matterhorn, "How to Share Data Between a Host Computer & Virtual Machine," EHOW, pp. 1-3, <http://www.ehow.com/how_7385388_share-host-computer-virtual-machine.html>, Retrieved Feb. 17, 2013.

J. Cheng et al., "Context-Aware Object Connection Discovery in Large Graphs", Data Engineering, 2009. ICDE '09. IEEE 25th International Conference on, pp. 856-867.

Richard Saling, "How to Give a Great Presentation! From the HP Learning Center", Jul. 28, 2008, <http://rsaling.wordpress.com/2008/07/28/how-to-give-a-great-presentation/>, pp. 1-28.

A. Birrell et al., "A design for high-performance flash disks." ACM SIGOPS Operating Systems Review 41.2 (2007), pp. 88-93.

N. Saxena et al., "Data remanence effects on memory-based entropy collection for RFID systems", International Journal of Information Security 10.4 (2011), pp. 213-222.

(56) References Cited

OTHER PUBLICATIONS

A. Jin, et al., "Biohashing: Two Factor Authentication Featuring Fingerprint Data and Tokenised Random Number," Pattern Recognition 37, Elsevier Ltd., 2004, pp. 2245-2255.

M. Yu, et al., "Secure and Robust Error Correction for Physical Unclonable Functions", Verifying Physical Trustworthiness of ICS and Systems, IEEE Design & Test of Computers, IEEE, Jan./Feb. 2010, pp. 48-64.

P. Kanerva, "What We Mean When We Say "What's the Dollar of Mexico?": Prototypes and Mapping in Concept Space", Quantum Informatics for Cognitive, Social, and Semantic Processes: Papers From the AAAI Fall Symposium, Association for the Advancement of Artificial Intelligence, 2010, pp. 2-6.

P. Kanerva, "Hyperdimensional Computing: An Introduction to Computing in Distributed Representation With High-Dimensional Random Vectors", Springer Science+Business Media, LLC, COGN Comput, 1, 2009, pp. 139-159.

M.J. Flynn, et al., "Sparse Distributed Memory Principles of Operation", Research Institute for Advanced Computer Science, 1989, pp. 1-60.

R. Angles et al., "Survey of Graph Database Models", ACM Computing Surveys, vol. 40, No. 1, Article 1, Feb. 2008, pp. 1-65.

U.S. Appl. No. 13/342,406—Non-Final Office Action Mailed Sep. 27, 2013.

U.S. Appl. No. 13/610,347—Non-Final Office Action Mailed Jul. 19, 2013.

U.S. Appl. No. 13/610,347—Notice of Allowance Mailed Aug. 19, 2013.

"Ninth New Collegiate Dictionary", Merriam-Webster Inc., 1991, pp. 77 and 242.

"The American Heritage College Dictionary", Fourth Edition, Houghton Mifflin Company, 2004, pp. 44 and 262.

U.S. Appl. No. 13/680,832—Non-Final Office Action Mailed Apr. 8, 2014.

U.S. Appl. No. 13/628,853—Notice of Allowance Mailed Mar. 4, 2014.

U.S. Appl. No. 13/540,267—Non-Final Office Action Mailed Feb. 4, 2014.

U.S. Appl. No. 13/540,230—Non-Final Office Action Mailed Jan. 30, 2014.

U.S. Appl. No. 13/540,295—Non-Final Office Action Mailed Jan. 30, 2014.

U.S. Appl. No. 13/609,710—Non-Final Office Action Mailed Jan. 27, 2014.

U.S. Appl. No. 13/342,406—Notice of Allowance Mailed Mar. 20, 2014.

U.S. Appl. No. 13/628,853—Non-Final Office Action Mailed Nov. 7, 2013.

U.S. Appl. No. 13/593,905—Notice of Allowance Mailed Oct. 25, 2013.

U.S. Appl. No. 13/593,905—Non-Final Office Action Mailed May 8, 2013.

U.S. Appl. No. 13/595,356—Non-Final Office Action Mailed Apr. 14, 2014.

U.S. Appl. No. 13/755,623—Notice of Allowance Mailed May 27, 2014.

S. Alam et al., "Interoperability of Security-Enabled Internet of Things", Springer, Wireless Personal Communications, Dec. 2011, vol. 61, pp. 567-586.

U.S. Appl. No. 13/648,801—Non-Final Office Action Mailed Jul. 1, 2014.

U.S. Appl. No. 13/609,710—Final Office Action Mailed Jul. 24, 2014.

U.S. Appl. No. 13/733,052—Non-Final Office Action mailed Sep. 18, 2014.

U.S. Appl. No. 13/861,058—Non-Final Office Action mailed Dec. 11, 2014.

U.S. Appl. No. 13/648,801 Examiner's Answer Mailed Oct. 1, 2015.

DATA SEARCH PROGRAM 1002

ENTER YOUR QUESTION: 1006

IS COMPANY X A GOOD COMPANY?

1004  1008  1010

WHAT IS THE PURPOSE OF YOUR REQUEST?

☒ INTERESTED IN JOB BENEFITS
☐ INTERESTED IN FINANCIAL INFO
☐ INTERESTED IN IP PORTFOLIO
☐ Other _____

1011

IDENTIFY WHAT TYPE OF PROJECT YOU ARE CURRENTLY WORKING ON:

☐ JOB APPLICANT SCREENING
☒ SALES CALL    1012
☐ RESEARCH PROJECT
☐ Other _____

1013

HOW QUICKLY DO YOU NEED THE DATA?

☒ WITHIN THE NEXT 5 MINUTES
☐ WITHIN AN HOUR
☐ WITHIN A WEEK
☐ Other _____

1018

IDENTIFY YOUR SPECIFIC LOCATION:

☐ MY DESK
☒ CUSTOMER'S SITE
☐ PUBLIC HOT SPOT
☐ Other _____

1014

IDENTIFY YOUR RELATIONSHIP TO THE ENTERPRISE THAT OWNS THE REQUESTED DATA:

☒ FULL-TIME EMPLOYEE
☐ CONTRACT EMPLOYEE
☐ NON-EMPLOYEE
☐ Other _____

1020

IDENTIFY ANY CURRENT EDUCATIONAL CERTIFICATIONS:

☐ HR CERTIFICATION
☒ LAW LICENSE
☐ ADVANCED ENGINEERING DEGREE
☐ Other _____

1016

IDENTIFY HOW LONG YOU HAVE WORKED IN YOUR CURRENT FIELD:

☐ LESS THAN A MONTH
☒ LESS THAN A YEAR
☐ MORE THAN A YEAR
☐ Other _____

CONTEXT-BASED SECURITY SCREENING FOR ACCESSING DATA

BACKGROUND

The present disclosure relates to the field of computers, and specifically to the use of databases in computers. Still more particularly, the present disclosure relates to security clearances needed to access data from a particular database.

A database is a collection of data. Examples of database types include relational databases, graph databases, network databases, and object-oriented databases. Each type of database presents data in a non-dynamic manner, in which the data is statically stored.

SUMMARY

A processor-implemented method, system, and/or computer program product securely accesses a specific data store. A non-contextual data object is associated with a context object to define a first synthetic context-based object. The non-contextual data object ambiguously describes multiple types of persons, and the context object provides a context that identifies a specific type of person from the multiple types of persons. The first synthetic context-based object is associated with at least one specific data store in a data structure. A string of binary data that describes a requester of data is received by a security module for generating a new synthetic context-based object. The security module determines the context according to a physical location of a computer being used, by the requester, to send the request to the security module; generates a new synthetic context-based object for the requester; determines whether the new synthetic context-based object matches the first synthetic context-based object; in response to determining that the new synthetic context-based object matches the first synthetic context-based object, the security module locates, via the first synthetic context-based object, said at least one specific data store. The security module provides the requester access to said at least one specific data store; constructs a dimensionally constrained hierarchical synthetic context-based object library for multiple synthetic context-based objects, wherein synthetic context-based objects within a same dimension of the dimensionally constrained hierarchical synthetic context-based object library share data from a same non-contextual data object, and wherein synthetic context-based objects within the same dimension of the dimensionally constrained hierarchical synthetic context-based object library contain disparate data from different context objects; receives from the requester the request for data from at least one data store that is associated with synthetic context-based objects within the same dimension of the dimensionally constrained hierarchical synthetic context-based object library; receives from the requester a time window for receiving the data from said at least one data store that is associated with synthetic context-based objects within the same dimension of the dimensionally constrained hierarchical synthetic context-based object library, wherein the time window describes an amount of time that the requester of data is willing to wait for at least one data store that is associated with synthetic context-based objects within the same dimension of the dimensionally constrained hierarchical synthetic context-based object library. The security module determines a security level of the requester based on the time window received from the requester, wherein a longer time window is indicative of a higher security level for the requester than a relatively shorter time window; matches, based on the time window for the requester, the security level of the requester to data from said at least one specific data store that is associated with synthetic context-based objects within the same dimension of the dimensionally constrained hierarchical synthetic context-based object library; and returns, to the requester, data from said at least one specific data store that is associated with synthetic context-based objects within the same dimension of the dimensionally constrained hierarchical synthetic context-based object library and that matches the security level of the requester.

BRIEF DESCRIPTION OF THE SEVERAL VIEWS OF THE DRAWINGS

FIG. 10 depicts an exemplary user interface for inputting user context information related to a data request;

DETAILED DESCRIPTION

Figure 1:
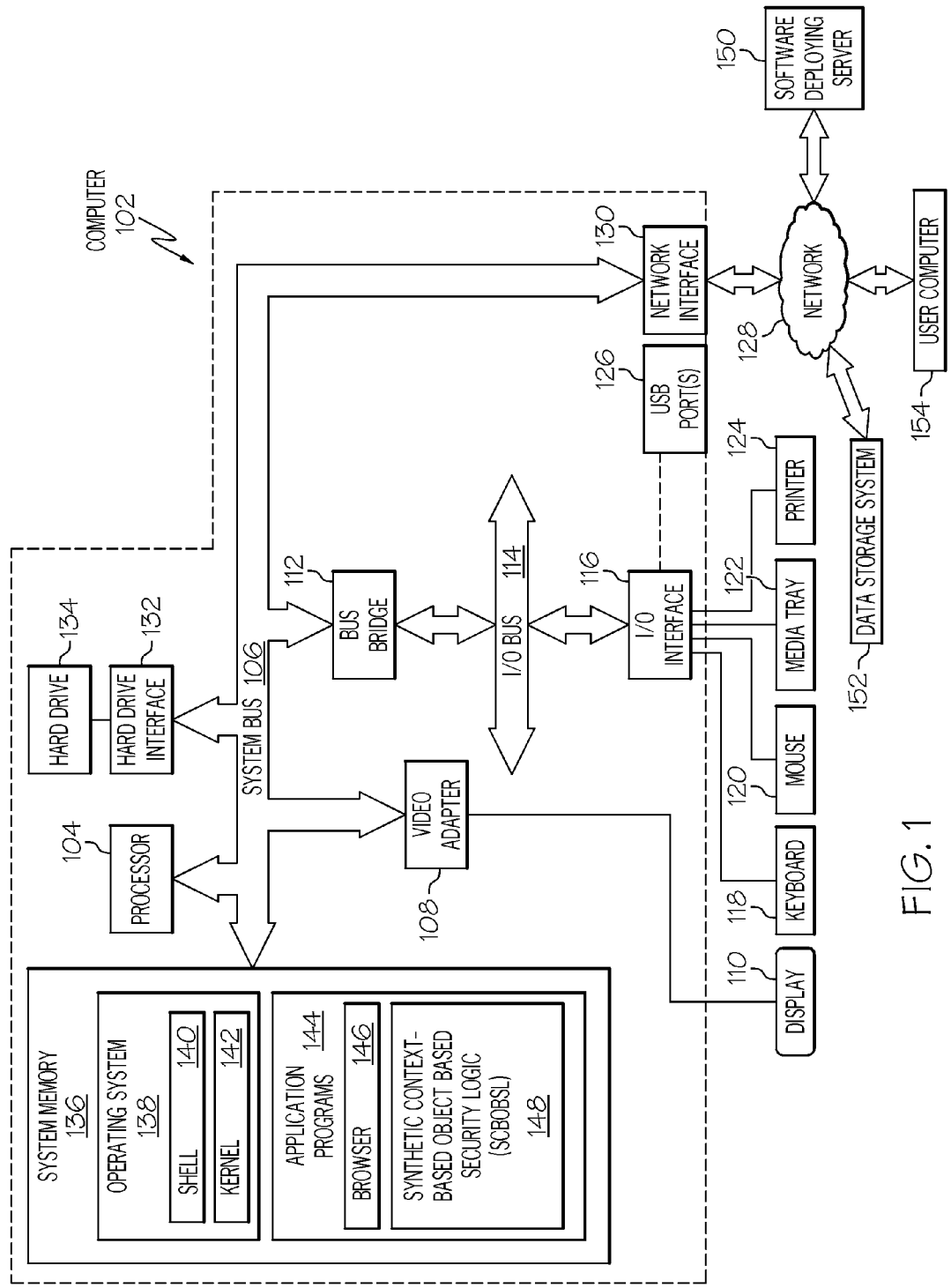
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 102 may be utilized by software deploying server 150, a data storage system 152, and/or a user computer 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a synthetic context-based object based security logic (SCBOBSL) 148. SCBOBSL 148 includes code for implementing the processes described below, including those described in FIGS. 2-15. In one embodiment, computer 102 is able to download SCBOBSL 148 from software deploying server 150, including in an on-demand basis, wherein the code in SCBOBSL 148 is not downloaded until needed for execution. Note further that, in one embodiment of the present invention, software deploying server 150 performs all of the functions associated with the present invention (including execution of SCBOBSL 148), thus freeing computer 102 from having to use its own internal computing resources to execute SCBOBSL 148.

Figure 11:
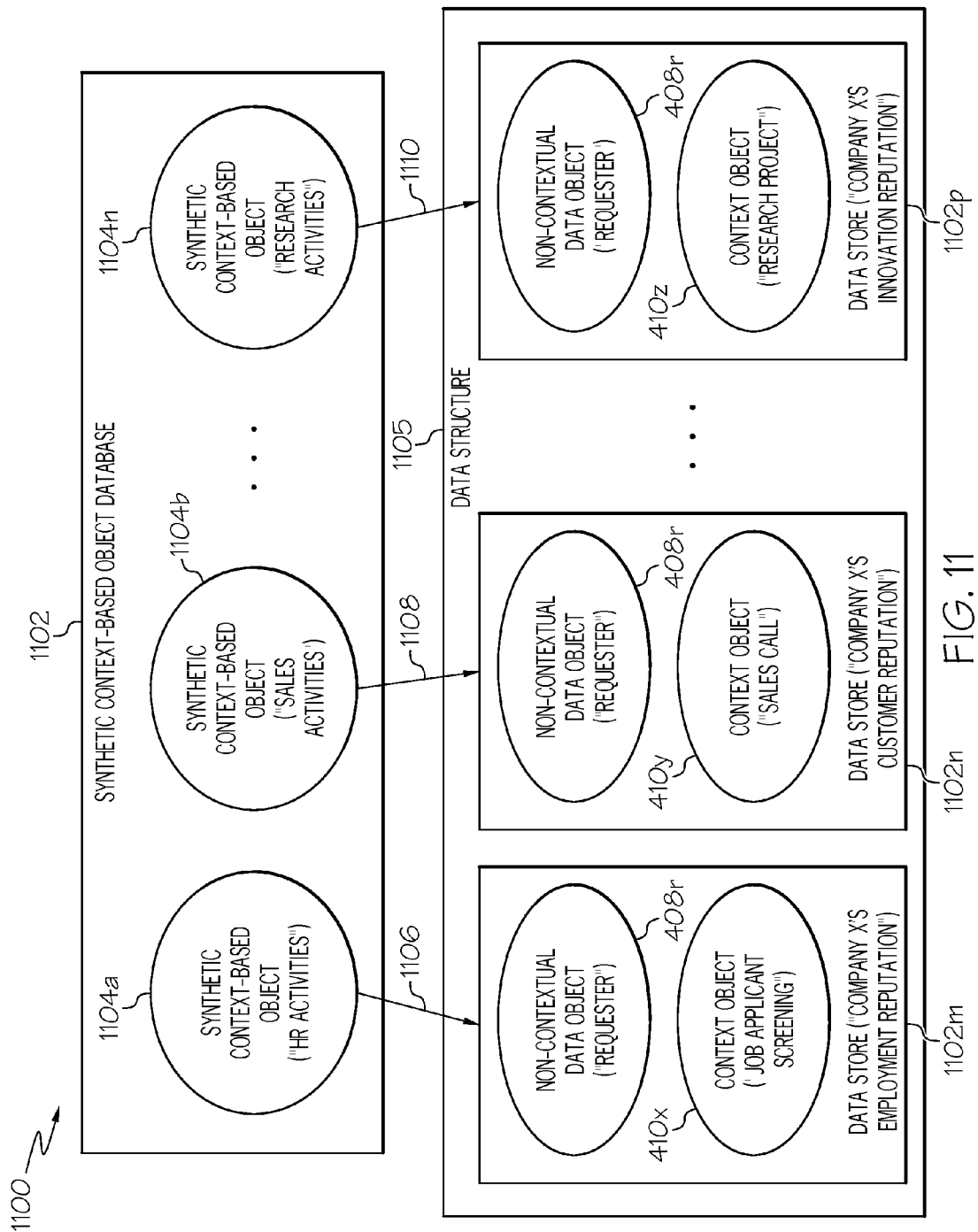
FIG. 11 illustrates a process for associating one or more data stores with specific synthetic context-based objects that define a data requester.

The data storage system 152 stores an electronic data structure, which may be audio files, video files, website content, text files, etc. In one embodiment, computer 102 contains the synthetic context-based object database described herein, while data storage system 152 contains the non-contextual data object database, context object database, and data structure described herein. For example, in one embodiment, exemplary synthetic context-based object database 202 depicted in FIG. 2 is stored in a synthetic context-based object database storage system, which is part of the hard drive 134 and/or system memory 136 of computer 102 and/or data storage system 152; non-contextual data object database 206 depicted in FIG. 2 is stored in a non-contextual data object database storage system, which is part of the hard drive 134 and/or system memory 136 of computer 102 and/or data storage system 152; context object database 212 depicted in FIG. 2 is stored in a context object database storage system, which is part of the hard drive 134 and/or system memory 136 of computer 102 and/or data storage system 152; and data structure 1105 depicted in FIG. 11 is stored in a data structure storage system, which is part of data storage system 152 and/or the hard drive 134 and/or system memory 136 of computer 102.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Note that SCBOBSL 148 is able to generate and/or utilize some or all of the databases depicted in the context-based system referenced in FIGS. 2-15.

Figure 2:
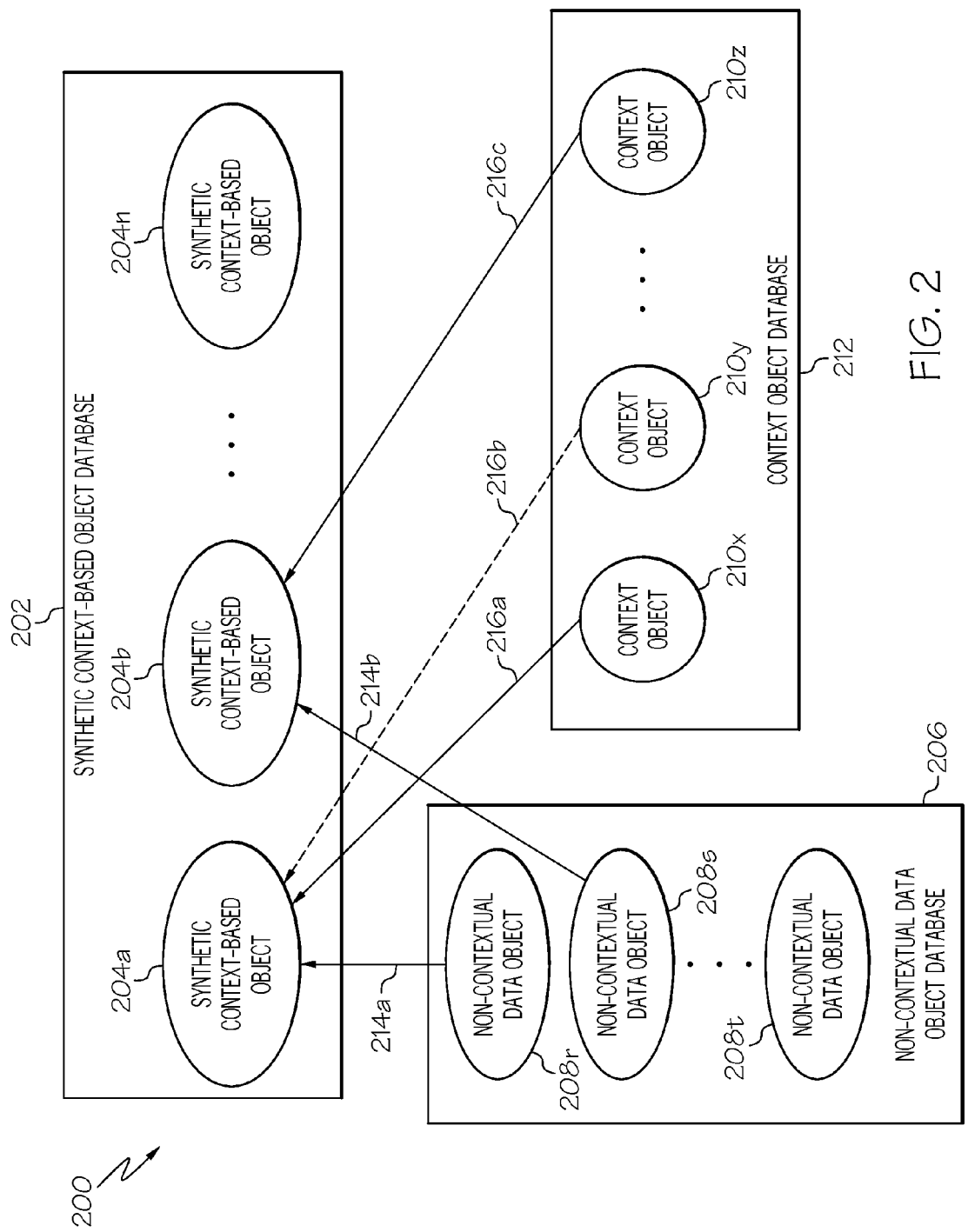
FIG. 2 illustrates a process for generating one or more synthetic context-based objects.

With reference now to FIG. 2, a process for generating one or more synthetic context-based objects in a system 200 is presented. Note that system 200 is a processing and storage logic found in computer 102 and/or data storage system 152 shown in FIG. 1, which process, support, and/or contain the databases, pointers, and objects depicted in FIG. 2.

Within system 200 is a synthetic context-based object database 202, which contains multiple synthetic context-based objects 204*a*-204*n* (thus indicating an "n" quantity of objects, where "n" is an integer). Each of the synthetic context-based objects 204*a*-204*n* is defined by at least one non-contextual data object and at least one context object. That is, at least one non-contextual data object is associated with at least one context object to define one or more of the synthetic context-based objects 204*a*-204*n*. The non-contextual data object ambiguously relates to multiple subject-matters, and the context object provides a context that identifies a specific subject-matter, from the multiple subject-matters, of the non-contextual data object.

Note that the non-contextual data objects contain data that have no meaning in and of themselves, and therefore ambiguously describe multiple subject-matters. That is, the data in the context objects are not merely attributes or descriptors of the data/objects described by the non-contextual data objects. Rather, the context objects provide additional information about the non-contextual data objects in order to give these non-contextual data objects meaning. Thus, the context objects do not merely describe something, but rather they define what something is. Without the context objects, the non-contextual data objects contain data that is meaningless; with the context objects, the non-contextual data objects become meaningful.

For example, assume that a non-contextual data object database 206 includes multiple non-contextual data objects 208*r*-208*t* (thus indicating a "t" quantity of objects, where "t" is an integer). However, data within each of these non-contextual data objects 208*r*-208*t* by itself is ambiguous, since it has no context. That is, the data within each of the non-contextual data objects 208*r*-208*t* is data that, standing alone, has no meaning, and thus is ambiguous with regards to its subject-matter. In order to give the data within each of the non-contextual data objects 208*r*-208*t* meaning, they are given context, which is provided by data contained within one or more of the context objects 210*x*-210*z* (thus indicating a "z" quantity of objects, where "z" is an integer) stored within a context object database 212. For example, if a pointer 214*a* points the non-contextual data object 208*r* to the synthetic context-based object 204*a*, while a pointer 216*a* points the context object 210*x* to the synthetic context-based object 204a, thus associating the non-contextual data object 208r and the context object 210x with the synthetic context-based object 204a (e.g., storing or otherwise associating the data within the non-contextual data object 208r and the context object 210x in the synthetic context-based object 204a), the data within the non-contextual data object 208r now has been given unambiguous meaning by the data within the context object 210x. This contextual meaning is thus stored within (or otherwise associated with) the synthetic context-based object 204a.

Similarly, if a pointer 214b associates data within the non-contextual data object 208s with the synthetic context-based object 204b, while the pointer 216c associates data within the context object 210z with the synthetic context-based object 204b, then the data within the non-contextual data object 208s is now given meaning by the data in the context object 210z. This contextual meaning is thus stored within (or otherwise associated with) the synthetic context-based object 204b.

Note that more than one context object can give meaning to a particular non-contextual data object. For example, both context object 210x and context object 210y can point to the synthetic context-based object 204a, thus providing compound context meaning to the non-contextual data object 208r shown in FIG. 2. This compound context meaning provides various layers of context to the data in the non-contextual data object 208r.

Note also that while the pointers 214a-214b and 216a-216c are logically shown pointing toward one or more of the synthetic context-based objects 204a-204n, in one embodiment the synthetic context-based objects 204a-204n actually point to the non-contextual data objects 208r-208t and the context objects 210x-210z. That is, in one embodiment the synthetic context-based objects 204a-204n locate the non-contextual data objects 208r-208t and the context objects 210x-210z through the use of the pointers 214a-214b and 216a-216c.

Note that the data within the non-contextual data objects described herein are so ambiguous that they are essentially meaningless. For example, consider the exemplary case depicted in FIG. 3, where data from the non-contextual data object 308r is simply the term "good company". Standing alone, "good company" is meaningless, since it is vague and ambiguous what the descriptor "good" means and/or what aspect (i.e., component, function, etc.) of "company" is being described by "good". As depicted, data (i.e., "good" and/or "company") from the non-contextual data object 308r is associated with (e.g., stored in or associated by a look-up table, etc.) a synthetic context-based object 304a, which is devoted to the subject-matter "good employer". This data ("good company") from non-contextual data object 308r is also associated with a synthetic context-based object 304b, which is devoted to the subject-matter "good customer" and a synthetic context-based object 304n, which is devoted to the subject-matter "technology leader". In order to give contextual meaning to the term "good company" in the context of describing Company X as a "good employer", context object 310x, which contains the context data "job benefits" is also associated with (e.g., stored in or associated by a look-up table, etc.) the synthetic context-based object 304a. Similarly, associated with the synthetic context-based object 304b is a context object 310y, which provides the context data from "financial reports" to the term "good company" provided by the non-contextual data object 308r. Thus, the synthetic context-based object 304b now defines the term "good company" according to data (from context object 310y) from "financial reports" about Company X, thus describing whether Company X is a "good customer" (i.e., is able to pay their bills). Similarly, associated with the synthetic context-based object 304n is a context object 310z, which provides the context data from "Intellectual Property (IP) data" (i.e., a database of patents owned by Company X) to the term "good company" provided by the non-contextual data object 308r. Thus, the synthetic context-based object 304n now defines the term "technology leader" according to data (from context object 310z) from "IP data" about Company X, thus describing whether Company X is a "technology leader" (i.e., owns a substantial IP portfolio of innovations).

As described above, synthetic context-based objects can be used to provide context to a query itself (i.e., "Is Company X a good company"). In one embodiment of the present invention, however, synthetic context-based objects are used to provide a context of the person making the request/query. As described herein, the context of the person making the request is then used as a security screening feature. That is, the context of the person making the request determines if that particular person is authorized to access specific data. Examples of different contexts that are used to define the context of the data requester are presented in FIGS. 4-9.

Figure 4:
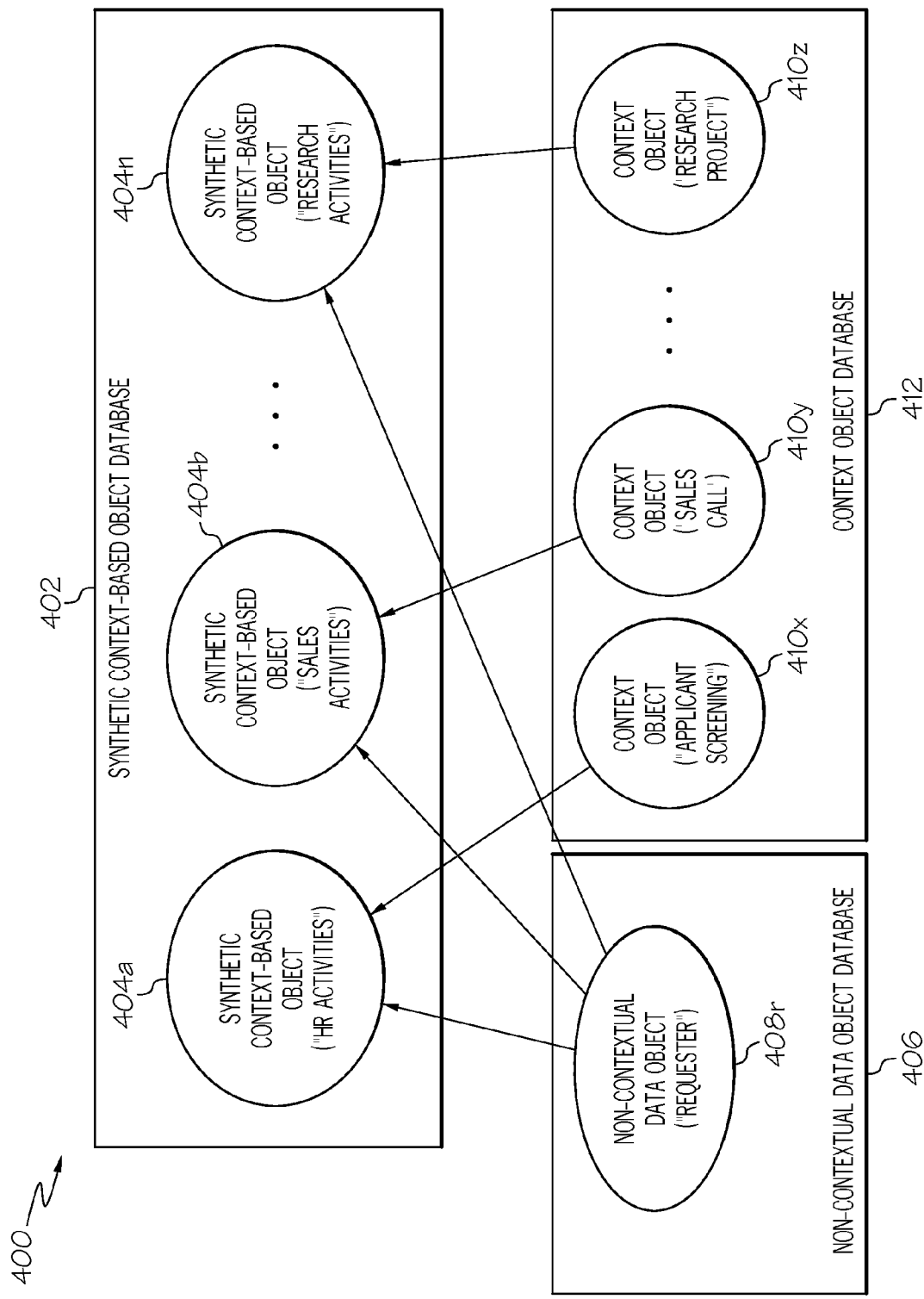
FIG. 4 depicts an exemplary use case in which synthetic context-based objects are defined for the non-contextual data object "requester", who is requesting information about a particular company, based on the requester's work context.

With reference now to FIG. 4, assume that a requester is simply identified in a non-contextual data object 408r, found in a non-contextual data object database 406, as "requester". The term "requester" is meaningless, since there is no context as to who the requester is, what the requester's activities are, where the requester is located, how much of a rush the requester is in, how experienced the requester is, etc. That is, there is no context provided to describe the environment, circumstances, and/or other information about the requester.

The system 400 is a processing and storage logic found in computer 102 and/or data storage system 152 shown in FIG. 1, which process, support, and/or contain the databases, pointers, and objects depicted in FIG. 4 that are used to create a synthetic context-based object to describe a particular type of data requester. Thus, in the example shown in FIG. 4, data from context object 410x ("job applicant screening") from context object database 412 describes what type of job/project a requester (identified by non-contextual data object 408r) is working on at the time data about a particular subject (e.g., "Company X") is being requested. The context from context object 410x, when applied to the term "requester" from non-contextual data object 408r, defines a synthetic context-based object 404a in a synthetic context-based object database 402. As depicted, synthetic context-based object 404a provides a contextual descriptor of the requester as working in human resources (HR) activities, based on the circumstance of the requester (described in non-contextual data object 408r) performing the task of screening job applicants (described in context object 410x) at the time that the request for information about Company X is made. Similarly, data from context object 410y describes the job/project that the requester is performing as being a "sales call." The context from context object 410y, when applied to the term "requester" from non-contextual data object 408r, defines a synthetic context-based object 404b, which provides a contextual descriptor of the requester as working on sales activities, based on the circumstance that the requester is performing the task of making a sales call (described in context object 410y) at the time that the request for information about Company X is made. Similarly, data from context object 410z describes the job/project that the requester is performing as working on a "research project." The context from context object 410z, when applied to the term "requester" from non-contextual data object 408r, defines a synthetic context-based object 404n, which provides a contextual descriptor of the requester as currently working on research activities, based on the circumstance that the requester is performing the task of working on a research project (described in context object 410z) at the time that the request for information about Company X is made. Note that the synthetic context-based objects 404a-n do not define a role/title of the requester. Rather, the synthetic context-based objects 404a-n define the activity of the requester at the time of the request for information about Company X.

Figure 5:
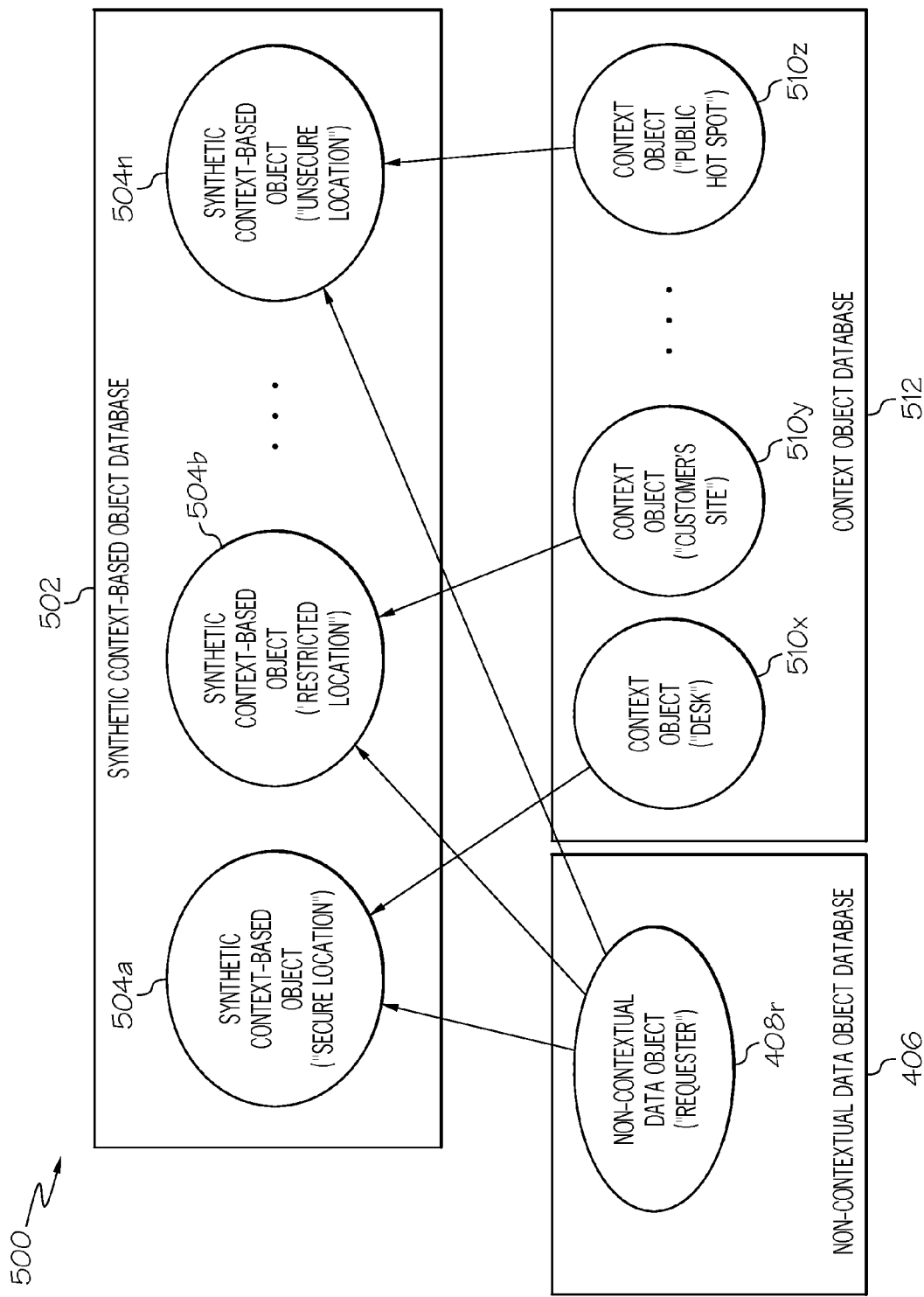
FIG. 5 illustrates an exemplary use case in which synthetic context-based objects are defined for the non-contextual data object "requester" based on a location of a computer being used by the requester.

With reference now to FIG. 5, a system 500 (which is a processing and storage logic found in computer 102 and/or data storage system 152 shown in FIG. 1), processes, supports, and/or contains the databases, pointers, and objects depicted in FIG. 5 for creating another synthetic context that describes a data requester. In the example shown in FIG. 5, data from context object 510x ("desk") from context object database 512 describes where a computer that is being used by a data requester (identified by non-contextual data object 408r) is located. The context from context object 510x, when applied to the term "requester" from non-contextual data object 408r, defines a synthetic context-based object 504a in a synthetic context-based object database 502. As depicted, synthetic context-based object 504a provides a contextual descriptor of the requester as a person who is working from a secure location, based on the circumstance that the requester (described in non-contextual data object 408r) and the location described in context object 510x (i.e., the data requester is working from his own desk, which has been previously determined to be a secure location) at the time that the request for information about Company X is made. Similarly, data from context object 510y describes the location from which the request is being made as the customer's site. The context from context object 510y, when applied to the term "requester" from non-contextual data object 408r, defines a synthetic context-based object 504b, which provides a contextual descriptor of the requester as working from a restricted location, based on the circumstance that the requester is performing the task of making the request from the customer's site (described in context object 510y). Similarly, data from context object 510z describes the location of the requester when making the data request as being at a public Wi-Fi hot spot. The context from context object 510z, when applied to the term "requester" from non-contextual data object 408r, defines a synthetic context-based object 504n, which provides a contextual descriptor of the requester as making the data request from an unsecure location.

Figure 6:
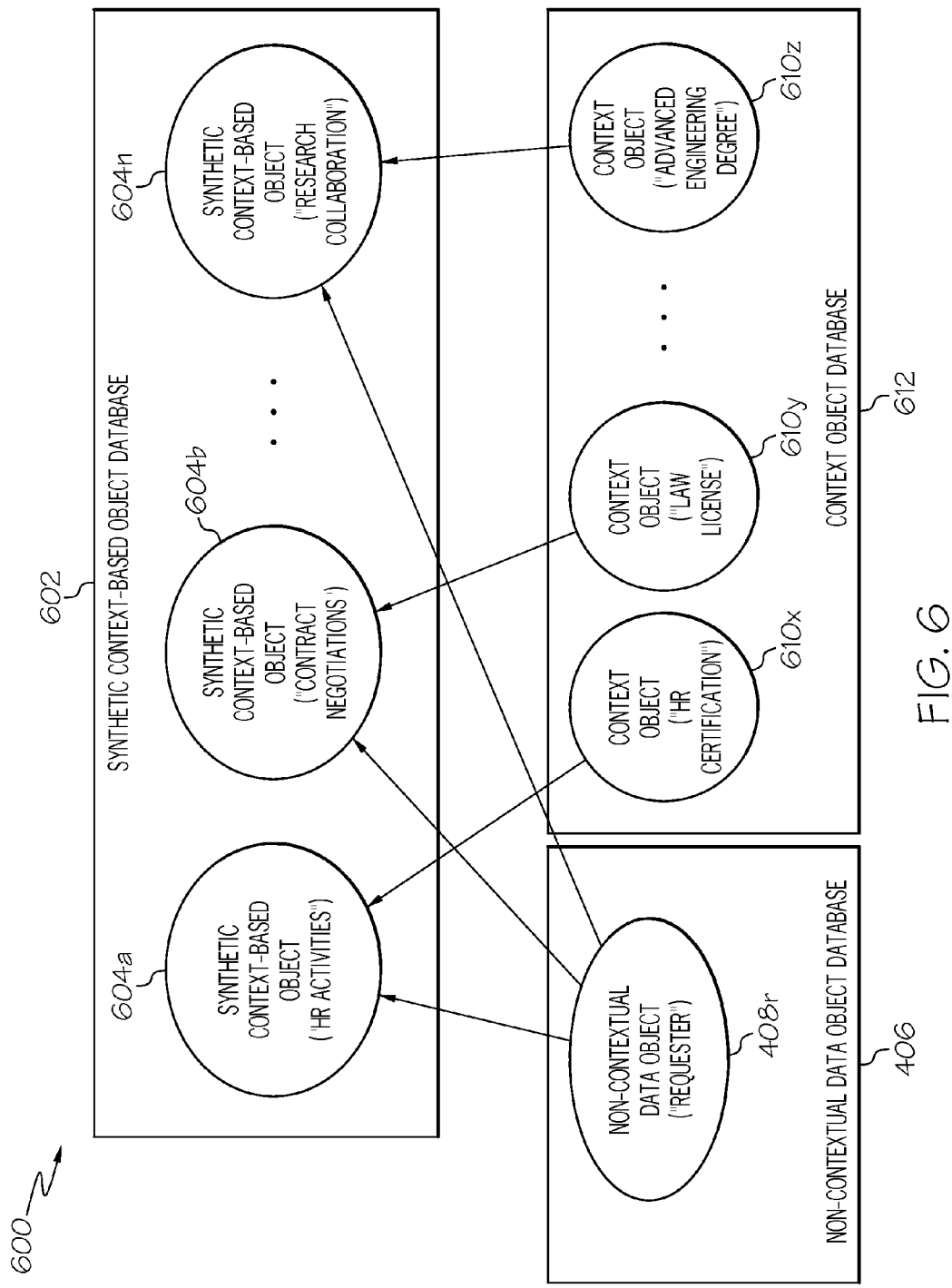
FIG. 6 depicts an exemplary use case in which synthetic context-based objects are defined for the non-contextual data object "requester" based on the requester's professional certifications.

With reference now to FIG. 6, a system 600 (which is a processing and storage logic found in computer 102 and/or data storage system 152 shown in FIG. 1), processes, supports, and/or contains the databases, pointers, and objects depicted in FIG. 6 for creating another synthetic context that describes a data requester. In the example shown in FIG. 6, data from context object 610x ("HR certification") from context object database 612 describes the requester as having a specific type of "HR certification. The context from context object 610x, when applied to the term "requester" from non-contextual data object 408r, defines a synthetic context-based object 604a in a synthetic context-based object database 602. As depicted, synthetic context-based object 604a provides a contextual descriptor of the requester as a person who is working on HR activities, based on the HR certification that the requester (described in non-contextual data object 408r) holds. Similarly, data from context object 610y describes the requester as holding a law license. The context from context object 610y, when applied to the term "requester" from non-contextual data object 408r, defines a synthetic context-based object 604b, which provides a contextual descriptor of the requester as working on contract negotiations, which have been predetermined to require the requester to hold a law license. Similarly, data from context object 610z describes the requester as holding an advanced engineering degree, which when combined with the term "requester" from non-contextual data object 408r, defines a synthetic context-based object 604n, which provides a contextual descriptor of the requester currently working on research collaboration. Note that the synthetic context-based objects 604a-604n do not define a role/title of the requester. Rather, the synthetic context-based objects 604a-604n define the activity of the requester at the time of the request for information about Company X.

Figure 7:
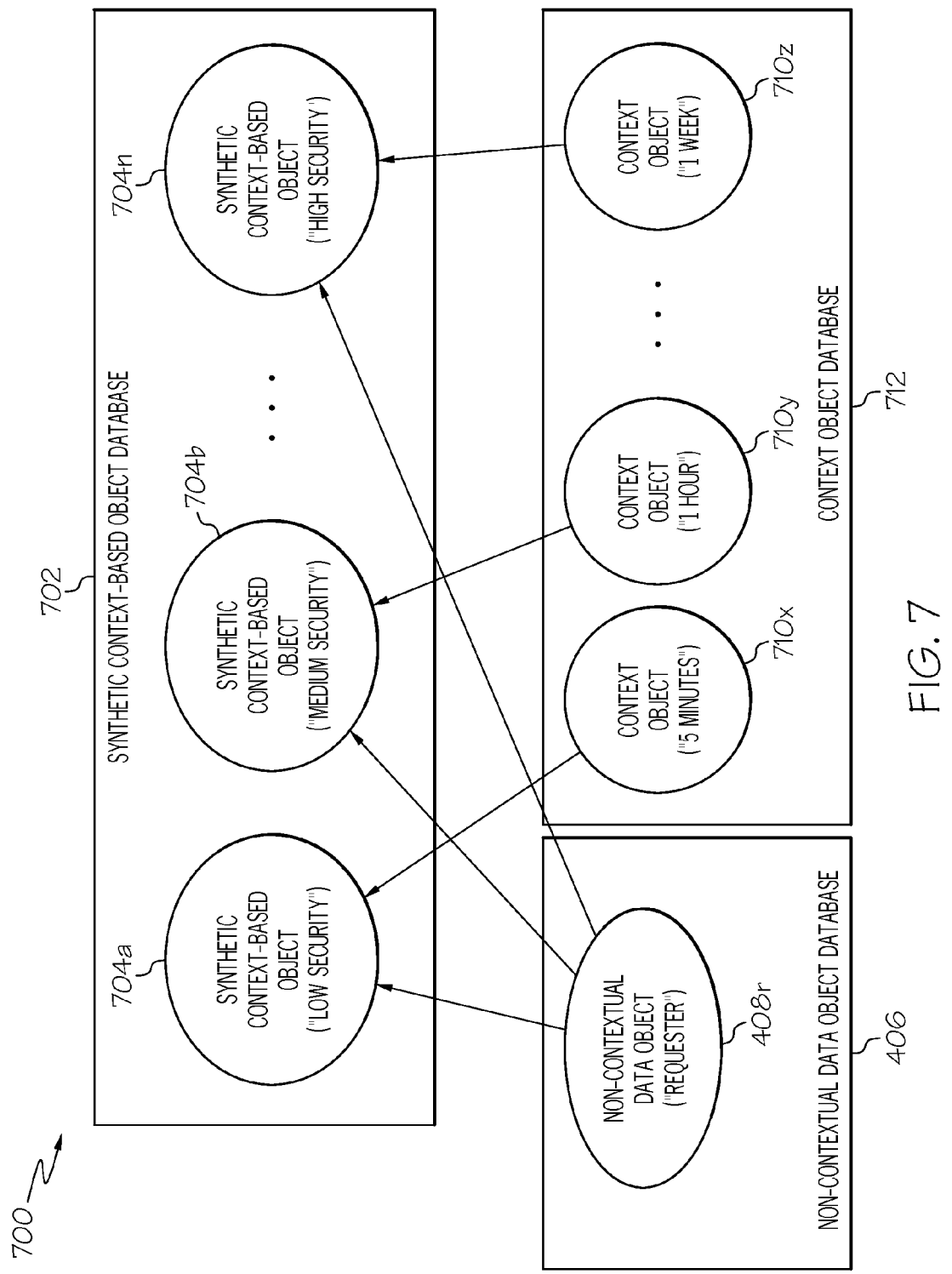
FIG. 7 illustrates an exemplary use case in which synthetic context-based objects are defined for the non-contextual data object "requester" based on a time constraint established by the requester.

With reference now to FIG. 7, a system 700 (which is a processing and storage logic found in computer 102 and/or data storage system 152 shown in FIG. 1), processes, supports, and/or contains the databases, pointers, and objects depicted in FIG. 7 for creating another synthetic context that describes a data requester. In the example shown in FIG. 7, data from context object 710x ("5 minutes") from context object database 712 describes the requester as requiring that the requested data be returned within 5 minutes. The context from context object 710x, when applied to the term "requester" from non-contextual data object 408r, defines a synthetic context-based object 704a in a synthetic context-based object database 702. As depicted, synthetic context-based object 704a provides a contextual descriptor of the requester as a person who can only have access to data that is protected by a low level of security, since there is not enough time to traverse through all of the screening steps needed to access high-security data. Similarly, data from context object 710y describes the requester as needing the requested data within "1 hour." The context from context object 710y, when applied to the term "requester" from non-contextual data object 408r, defines a synthetic context-based object 704b, which provides a contextual descriptor of the requester as being a person who can access data that is protected by medium security, which has more security protection (e.g., has a higher level of encryption, requires additional passwords, etc.) than the low security data associated with synthetic context-based object 704a. That is, by being willing to wait 1 hour instead of 5 minutes, the requester associated with the synthetic context-based object is indicating that he has enough time to pass through these additional security protection steps/levels. Similarly, data from context object 710z describes the requester as needing the requested data within "1 week." The context from context object 710z, when applied to the term "requester" from non-contextual data object 408r, defines a synthetic context-based object 704n, which provides a contextual descriptor of the requester as being a person who can access data that is protected by high security, which has more security protection (e.g., has a higher level of encryption, requires additional passwords, etc.) than the medium security data associated with synthetic context-based object 704b.

Figure 8:
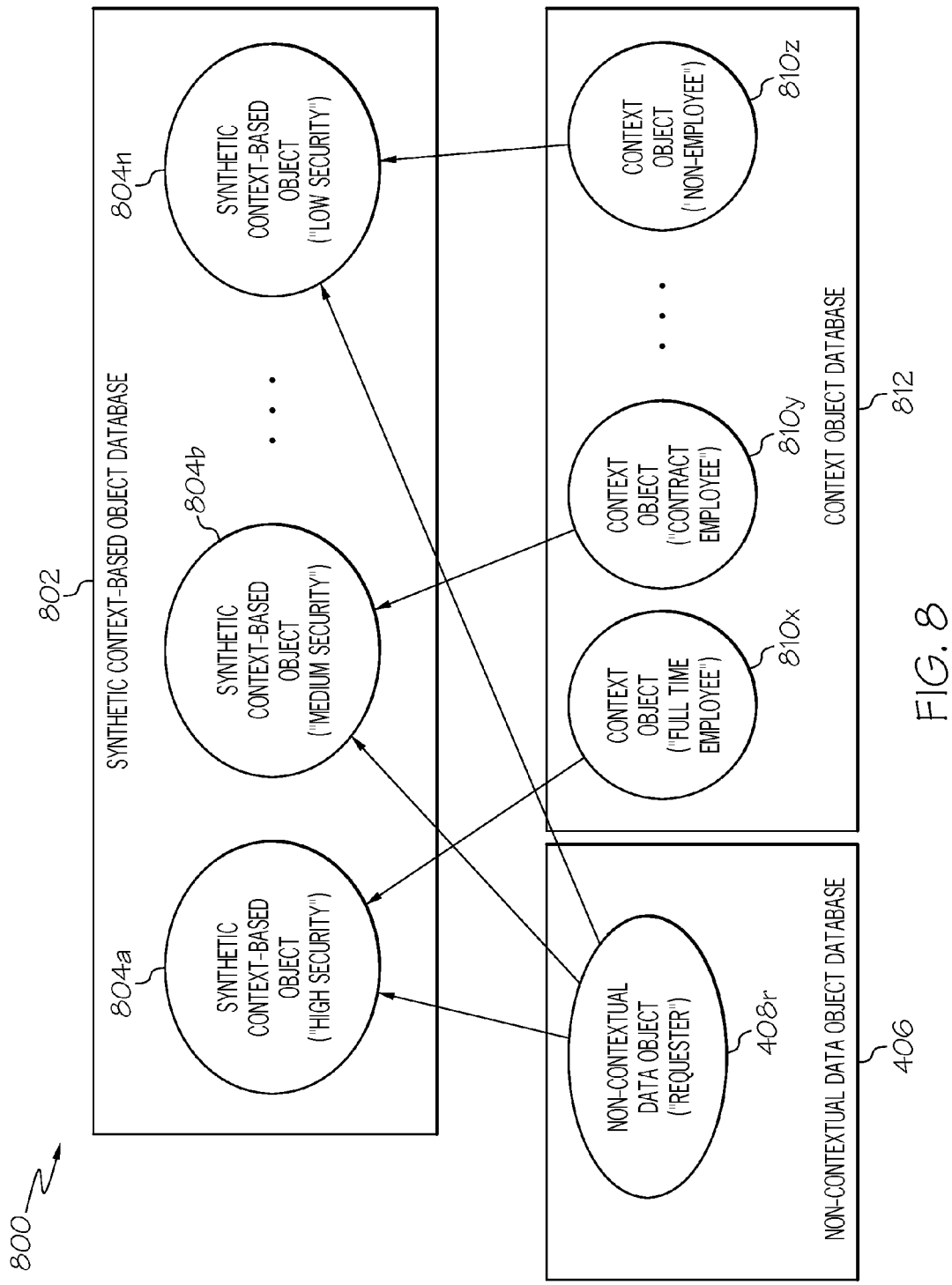
FIG. 8 depicts an exemplary use case in which synthetic context-based objects are defined for the non-contextual data object "requester" based on the requester's employment status.

With reference now to FIG. 8, a system 800 (which is a processing and storage logic found in computer 102 and/or data storage system 152 shown in FIG. 1), processes, supports, and/or contains the databases, pointers, and objects depicted in FIG. 8 for creating another synthetic context that describes a data requester. In the example shown in FIG. 8, data from context object 810*x* ("full time employee") from context object database 812 describes the requester as a full-time employee of the enterprise that owns and/or manages and/or maintains the database that contains data being requested by the requester. The context from context object 810*x*, when applied to the term "requester" from non-contextual data object 408*r*, defines a synthetic context-based object 804*a* in a synthetic context-based object database 802. As depicted, synthetic context-based object 804*a* provides a contextual descriptor of the requester as a person who can have access to data that is protected by a high level of security, since the person is a full time employee of the enterprise that owns the data, and thus is deemed to be a low security risk. Similarly, data from context object 810*y* describes the requester as being a contract employee of the enterprise that owns the data. The context from context object 810*y*, when applied to the term "requester" from non-contextual data object 408*r*, defines a synthetic context-based object 804*b*, which provides a contextual descriptor of the requester as being a person who can access data that is protected by medium security, which has less security protection (e.g., has a lower level of encryption, requires fewer passwords, etc.) than the high security data that can be accessed by requesters that are associated with synthetic context-based object 804*a*. That is, contract employees have been deemed to be less trustworthy than full time employees of the enterprise that owns the data, and thus such employees are only allowed to access data that is protected by less security than that data that is protected by the high security associated with synthetic context-based object 804*a*. Similarly, data from context object 810*z* describes the requester as being a non-employee of the enterprise that owns the requested data. The context from context object 810*z*, when applied to the term "requester" from non-contextual data object 408*r*, defines a synthetic context-based object 804*n*, which provides a contextual descriptor of the requester as being a person who can access only data that is protected by a low level of security, which has even less security protection (e.g., has an even lower level of encryption, requires even fewer passwords, etc.) than the medium security data associated with synthetic context-based object 804*b*.

Figure 9:
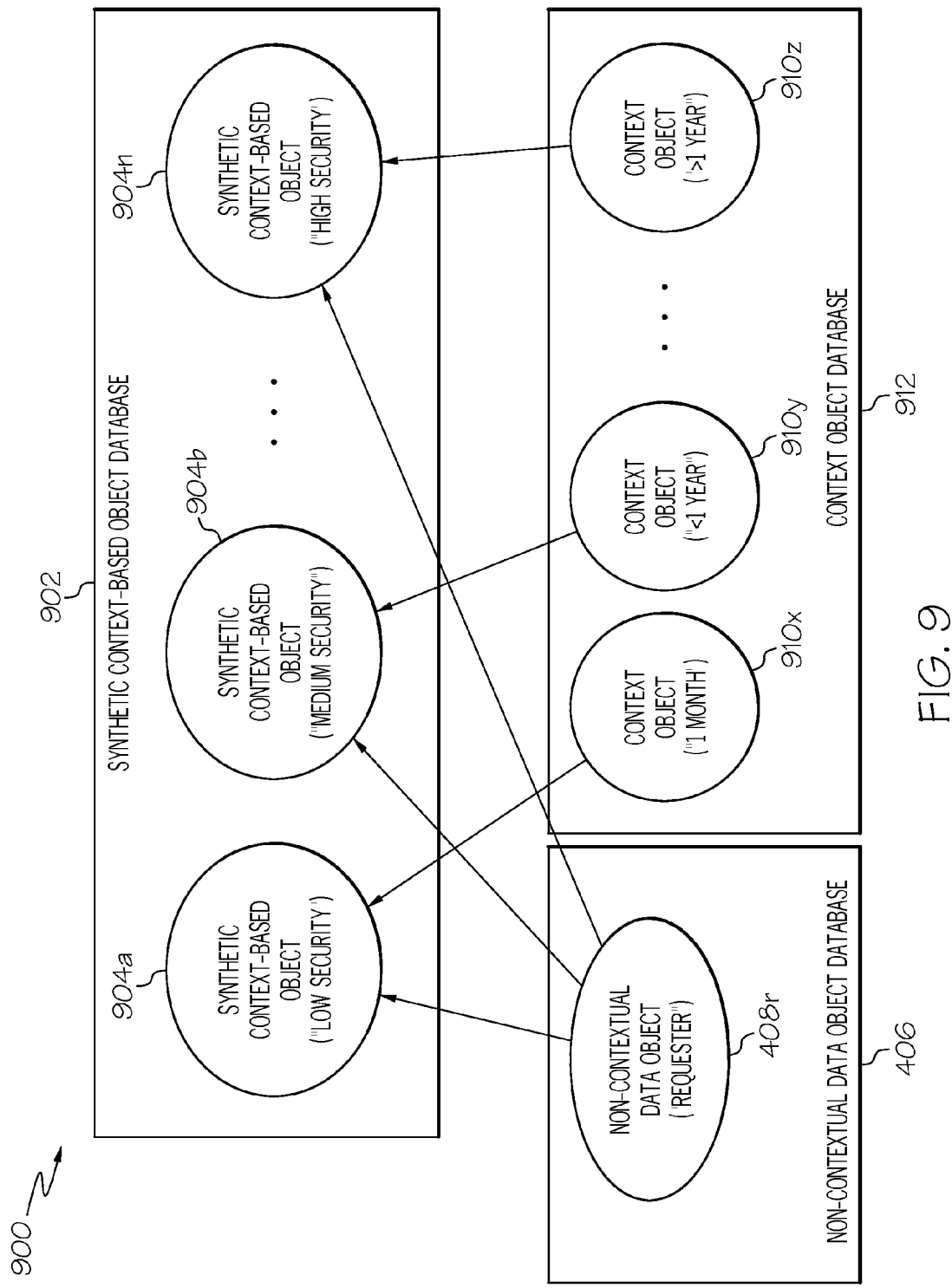
FIG. 9 illustrates an exemplary use case in which synthetic context-based objects are defined for the non-contextual data object "requester" based on the requester's amount of time working for an enterprise who manages requested data about a specific company.

With reference now to FIG. 9, a system 900 (which is a processing and storage logic found in computer 102 and/or data storage system 152 shown in FIG. 1), processes, supports, and/or contains the databases, pointers, and objects depicted in FIG. 9 for creating another synthetic context that describes a data requester. In the example shown in FIG. 9, data from context object 910*x* ("employee for less than 1 month") from context object database 912 describes the requester as a person who has been an employee, for less than one month, of the enterprise that owns and/or manages and/or maintains the database that contains data being requested by the requester. The context from context object 910*x*, when applied to the term "requester" from non-contextual data object 408*r*, defines a synthetic context-based object 904*a* in a synthetic context-based object database 902. As depicted, synthetic context-based object 904*a* provides a contextual descriptor of the requester as a person who can only have access to data that is relatively insensitive, and thus is protected by a low level of security, since the new employee of the enterprise is deemed to be a high security risk. Similarly, data from context object 910*y* describes the requester as being an employee of the enterprise for more than a month, but less than a year. The context from context object 910*y*, when applied to the term "requester" from non-contextual data object 408*r*, defines a synthetic context-based object 904*b*, which provides a contextual descriptor of the requester as being a person who can access data that is protected by medium security, which has more security protection (e.g., has a higher level of encryption, requires more passwords, etc.) than the low security data that can be accessed by requesters that are associated with synthetic context-based object 904*a*. That is, employees with 1-12 months' work experience with the enterprise have been deemed to be more trustworthy than employees with less than one month with the enterprise, and thus such employees are allowed to access data that is protected by more security than that data that is protected by the low security associated with synthetic context-based object 904*a*. Similarly, data from context object 910*z* describes the requester as being an employee of the enterprise for more than a year. The context from context object 910*z*, when applied to the term "requester" from non-contextual data object 408*r*, defines a synthetic context-based object 904*n*, which provides a contextual descriptor of the requester as being a person who can access data that is protected by a high level of security, which has even more security protection (e.g., has an even higher level of encryption, requires even more passwords, etc.) than the medium security data associated with synthetic context-based object 904*b*.

Figure 3:
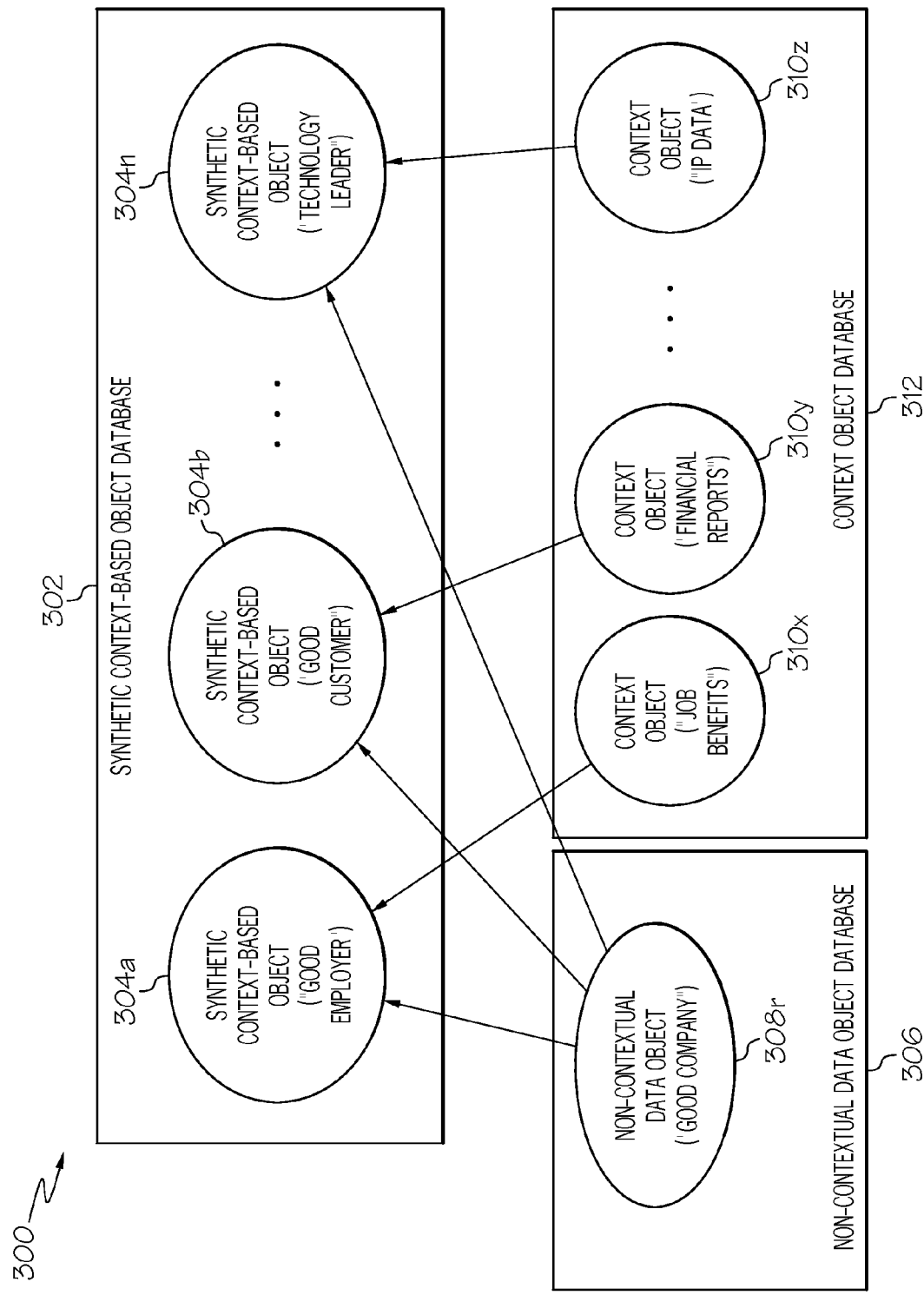
FIG. 3 illustrates an exemplary use case in which synthetic context-based objects are defined for the non-contextual data object data "good company" used to describe a company about which information is being requested.

Referring now to FIG. 10, an exemplary user interface 1000 for allowing the data requester to enter information that is used to create the context objects described above is presented. A data search program 1002 allows the user to enter a query in a block 1004 in a pane 1006. In the example shown, the query asks in active section 1008 about a "Company X". More specifically, the query asks in active section 1010 if Company X is a "good" company. Standing alone, this query is so ambiguous that it is meaningless. That is, what is meant by "good"? However, by associating this query to one of particular synthetic context-based objects described above in FIG. 3, an appropriate data store to answer the query can be located. The particular context object 310*x* can be defined from an entry in box 1011. For example, if the requester indicates that he is interested in job benefits of Company X, then context object 310*x* shown in FIG. 3 is associated with non-contextual data object 308*r* to create the synthetic context-based object 304*a*.

In the present invention, information can also be received from (i.e., derived from) entries in blocks 1012, 1014, 1016, 1018, 1020, and 1022. These entries relate respectively to the context objects depicted and described above in FIGS. 4-9. For example, if the data requester clicks option 1013 within block 1012, indicating that he is currently working on a sales call project, then context object 410*y* in FIG. 4 is associated with the non-contextual data object 408*r*, thus generating the synthetic context-based object 404*b* for association with that data requester.

Once the synthetic context-based objects are defined, they can be linked to data stores. A data store is defined as a data repository of a set of integrated data, such as text files, video files, webpages, etc. With reference now to FIG. 11, a process for associating one or more data stores with specific synthetic context-based objects in a system 1100 is presented. Note that system 1100 is a processing and storage logic found in computer 102 and/or data storage system 152 shown in FIG. 1, which process, support, and/or contain the databases, pointers, and objects depicted in FIG. 11. The data structure 1105 is a database of multiple data stores 1102*m*-1102*p* (thus indicating a "p" number of data stores, where "p" is an integer), which may be text documents, hierarchical files, tuples, object oriented database stores, spreadsheet cells, uniform resource locators (URLs), etc.

That is, in one embodiment, the data structure 1105 is a database of text documents (represented by one or more of the data stores 1102*m*-1102*p*), such as journal articles, webpage articles, electronically-stored business/medical/operational notes, etc.

In one embodiment, the data structure 1105 is a database of text, audio, video, multimedia, etc. files (represented by one or more of the data stores 1102*m*-1102*p*) that are stored in a hierarchical manner, such as in a tree diagram, a lightweight directory access protocol (LDAP) folder, etc.

In one embodiment, the data structure 1105 is a relational database, which is a collection of data items organized through a set of formally described tables. A table is made up of one or more rows, known as "tuples". Each of the tuples (represented by one or more of the data stores 1102*m*-1102*p*) share common attributes, which in the table are described by column headings. Each tuple also includes a key, which may be a primary key or a foreign key. A primary key is an identifier (e.g., a letter, number, symbol, etc.) that is stored in a first data cell of a local tuple. A foreign key is typically identical to the primary key, except that it is stored in a first data cell of a remote tuple, thus allowing the local tuple to be logically linked to the foreign tuple.

In one embodiment, the data structure 1105 is an object oriented database, which stores objects (represented by one or more of the data stores 1102*m*-1102*p*). As understood by those skilled in the art of computer software, an object contains both attributes, which are data (i.e., integers, strings, real numbers, references to another object, etc.), as well as methods, which are similar to procedures/functions, and which define the behavior of the object. Thus, the object oriented database contains both executable code and data.

In one embodiment, the data structure 1105 is a spreadsheet, which is made up of rows and columns of cells (represented by one or more of the data stores 1102*m*-1102*p*). Each cell (represented by one or more of the data stores 1102*m*-1102*p*) contains numeric or text data, or a formula to calculate a value based on the content of one or more of the other cells in the spreadsheet.

In one embodiment, the data structure 1105 is a collection of universal resource locators (URLs) for identifying a webpage, in which each URL (or a collection of URLs) is represented by one or more of the data stores 1102*m*-1102*p*.

The described types of data stores are exemplary, and are not to be construed as limiting what types of data stores are found within data structure 1105.

Note that the data structure 1105 is homogenous in one embodiment, while data structure 1105 is heterogeneous in another embodiment. For example, assume in a first example that data structure 1105 is a relational database, and all of the data stores 1102*m*-1102*p* are tuples. In this first example, data structure 1105 is homogenous, since all of the data stores 1102*m*-1102*p* are of the same type. However, assume in a second example that data store 1102*m* is a text document, data store 1102*n* is a financial spreadsheet, data store 1102*p* is a tuple from a relational database, etc. In this second example, data structure 1105 is a heterogeneous data structure, since it contains data stores that are of different formats.

FIG. 11 thus represents various data stores being "laid over" one or more of the synthetic context-based objects 1104*a*-1104*n*. That is, one or more of the data stores 1102*m*-1102*p* is mapped to a particular synthetic context-based object from the synthetic context-based objects 1104*a*-1104*n*, in order to facilitate exploring/searching the data structure 1105. For example, a pointer 1106 (e.g., an identifier located within both synthetic context-based object 1104*a* and data store 1102*m*) points the synthetic context-based object 1104*a* to the data store 1102*m*, based on the fact that the data store 1102*m* contains data ("requester") found in the non-contextual data object 408*r* as well as data ("job applicant screening") in the context object 410*x*, which together gave the subject-matter meaning to the synthetic context-based object 1104*a* as described above. Similarly, pointer 1108 points the synthetic context-based object 1104*b* to the data store 1102*n*, since synthetic context based object 1104*b* and data store 1102*n* both contain data from the non-contextual data object 408*r* as well as the context object 410*y*. Similarly, pointer 1110 points the synthetic context-based object 1104*n* to the data store 1102*p*, since synthetic context based object 1104*n* and data store 1102*p* both contain data from the non-contextual data object 408*r* as well as the context object 410*z*.

Figure 12:
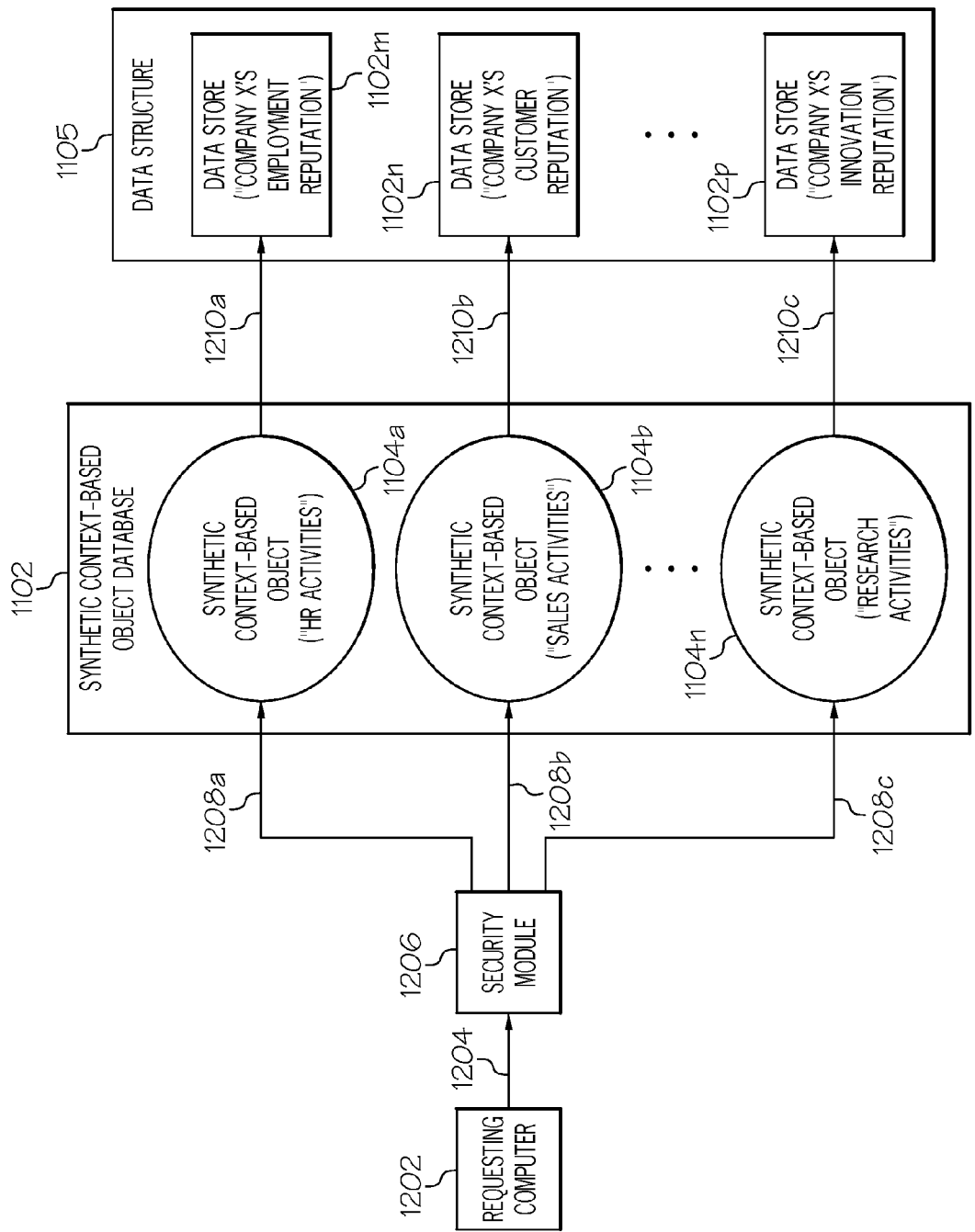
FIG. 12 depicts a process for applying security protection to a particular data store through the use of a particular synthetic context-based object that describes a requester of data about "Company X"

With reference now to FIG. 12, a process for applying security protection to a particular data store through the use of a particular synthetic context-based object that describes a requester of data about a particular subject is presented. A requester of data uses a requesting computer 1202 to send a data request 1204 to a security module 1206. In one embodiment, the requesting computer 1202 is the user computer 154 shown in FIG. 1, security module 1206 is computer 102 (e.g., in one embodiment, SCBOBSL 148 described in FIG. 1), synthetic context-based object database 1102 is stored in computer 102, and data structure 1105 is stored in data storage system 152.

When the security module 1206 receives the data request 1204 from the requesting computer 1202, the data request 1204 includes 1) the context of the data is being requested and 2) the context of the data requester. The context of the data being requested is provided by a synthetic context-based object such as synthetic context-based objects 304*a*-304*n* described in FIG. 3. The context of the data requester is provided by a synthetic context-based object such as synthetic context-based objects 404*a-n* described in FIG. 4. In one embodiment, the security module 1206 derives both types of synthetic context-based objects based on data entered in a user interface such as that described in FIG. 10. The security module 1206 then uses an appropriate pointer 1208*a*-1208*c* to point to the synthetic context-based object (from synthetic context-based objects 1104*a*-1104*n*) that matches the synthetic context-based object (e.g., synthetic context based object 404*a*) that describes the circumstantial context of the data requester. That is, if the security module 1206, using data received from user interface 1000 in FIG. 10, determines that the circumstantial context of the data requester is that of human resources activities (i.e., the security module 1206 creates/derives the synthetic context-based object 404*a* shown in FIG. 4), then the security module 1206 will use pointer 1208*a* to point to a matching synthetic context-based object 1104*a* (which has been pre-configured and stored within the synthetic context-based object database 1102). The synthetic context-based object 1104*a* then uses pointer 1210*a*, from pointers 1210*a*-1210*c*, to point the request to data store 1102*m*, which, based on the matching of the just-derived synthetic context-based object to synthetic context-based object 1104*a*, is now deemed to be available to the data requester (i.e., the data requester is now authorized to access data from data store 1102*m*).

Figure 13:
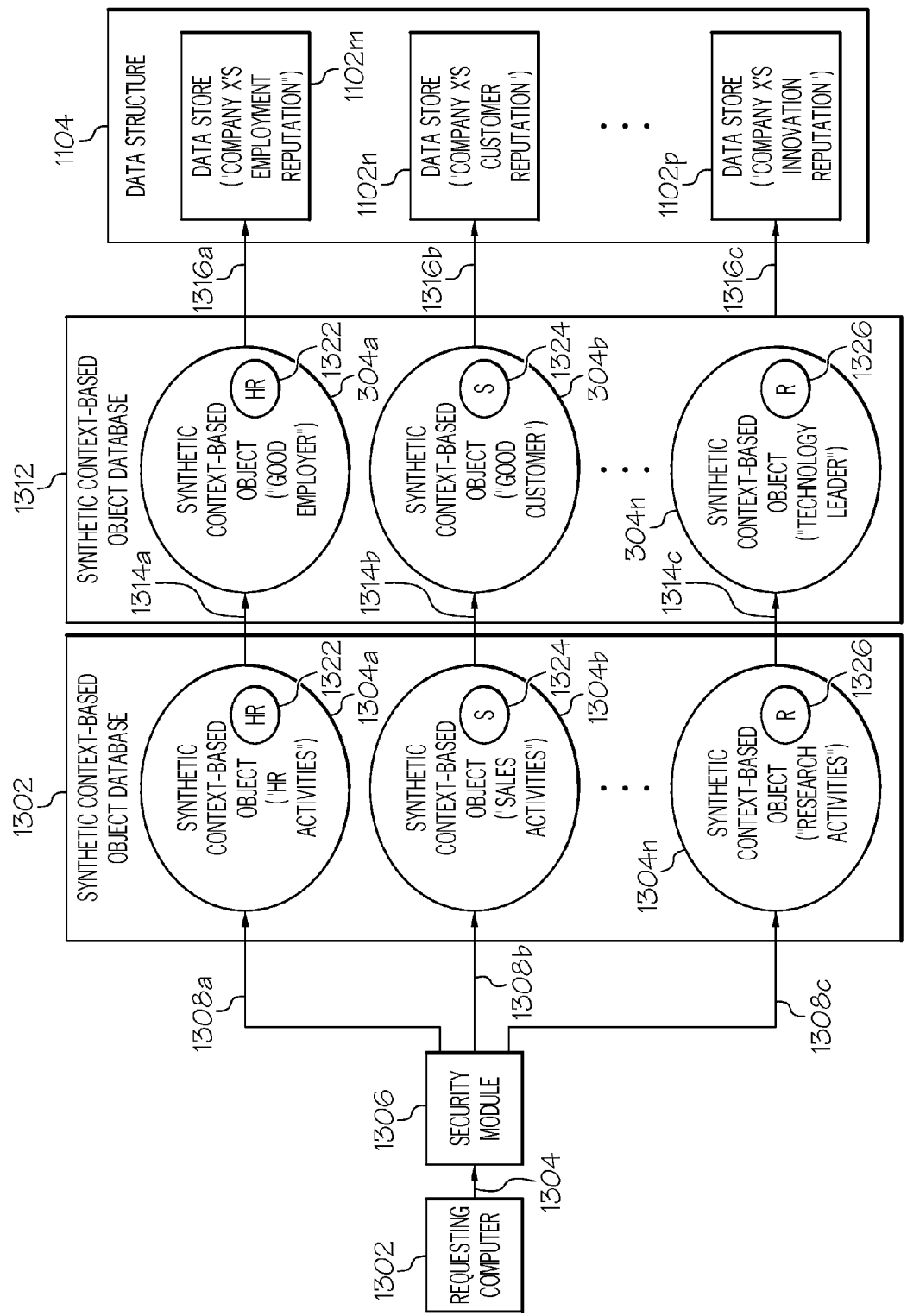
FIG. 13 depicts the process shown in FIG. 12 with an additional security layer of synthetic context-based objects that contextually describe "Company X"

As described in FIG. 13, an additional layer of context is provided in one embodiment by interposing two synthetic context-based object databases between the security module and the data structure. As in FIG. 12, a security module 1306 receives a data request 1304 from a requesting computer

1202. In this embodiment, the security module 1306 uses one of the pointers 1308*a*-1308*c* to point to one of the synthetic context-based objects 1304*a*-1304*n* found in the first synthetic context-based object database 1302, which describe the context of the data requester, and (one of which) match the synthetic context-based object that has just been derived by the security module 1306 for the data requester. However, in this embodiment, rather than pointing directly to the appropriate data store from the synthetic context-based object that matches that of the data requester (i.e., one of synthetic context-based objects 1304*a*-1304*n*), a pointer selected from pointers 1314*a*-1314*c* points to one of the synthetic context-based objects 304*a*-304*n*, which are found in the second synthetic context-based object database 1312, and which provide context to the data request itself. That is, the synthetic context-based objects 1304*a*-1304*n* provide context to the data requester, while the synthetic context-based objects 304*a*-304*n* provide context to the request itself. These two types of synthetic context-based objects are linked by sharing a descriptor, such as descriptor 1322 (for "HR" activities), descriptor 1324 (for "sales" activities), or descriptor 1326 (for "research" activities). One of the synthetic context-based objects 304*a*-304*n* then points to the appropriate data store from data stores 1102*m*-1102*p*.

Figure 14:
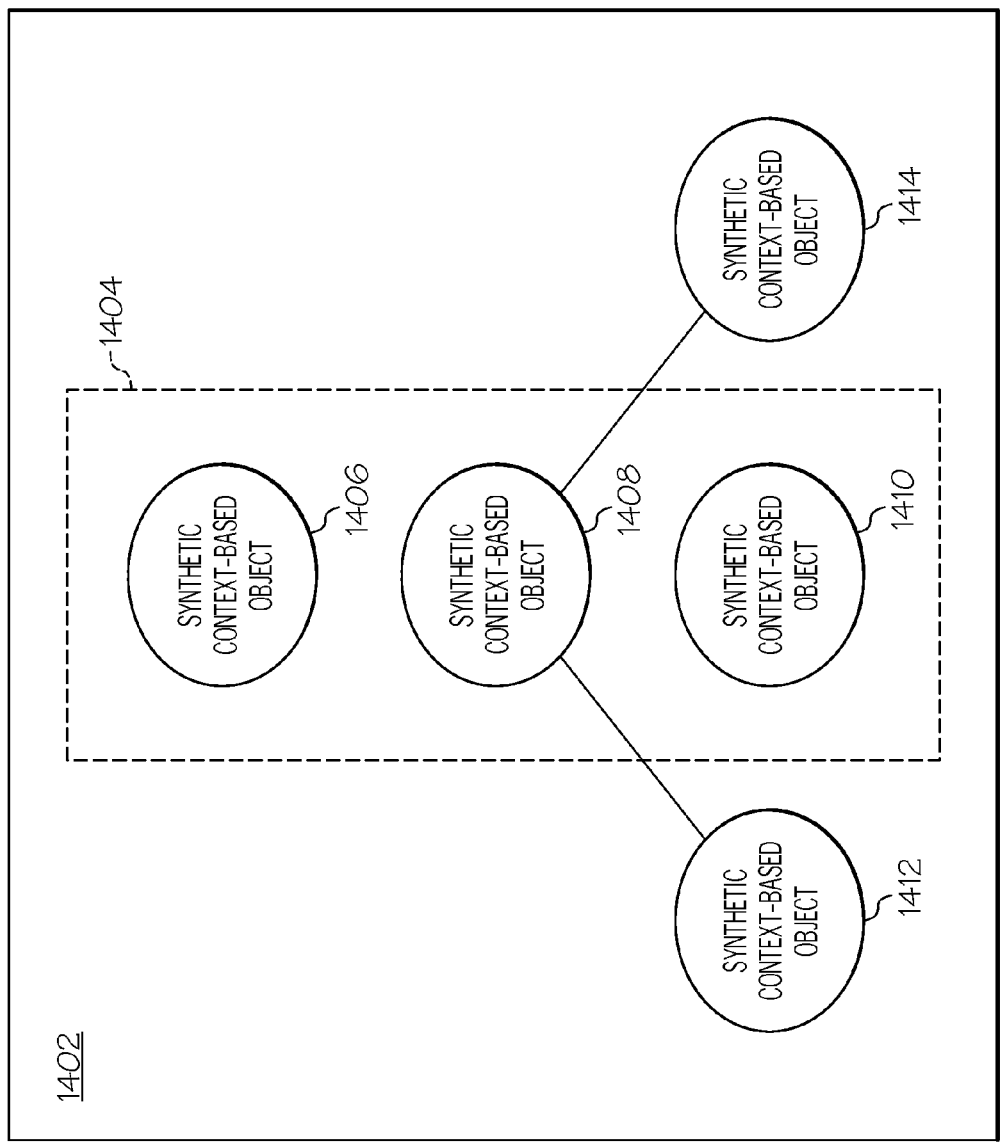
FIG. 14 illustrates a hierarchical synthetic context-based object database.

With reference then to FIG. 14, a process for applying security protection to one or more data stores through the use of a hierarchical synthetic context-based object library is presented. The requesting computer 1202 sends a query request 1204 to the security module 1206, as described above in FIGS. 12-13. The security module 1206/1306 then points to a vertical library 1404 in a system 1402, as depicted in FIG. 14. This allows pointers from the security module 1206/1306 to access all data stores that are pointed to by synthetic context-based objects 1406, 1408, and 1410. However, if security module 1206/1306 points (i.e., directs the query request) to only synthetic context-based object 1408, then only data stores that are associated with synthetic context-based objects 1408, 1412 and 1414 are accessed for the user. Furthermore, if security module 1206/1306 points (i.e., directs the query request) to only synthetic context-based object 1410, then only data stores that are associated with synthetic context-based object 1410 are accessed for the user.

Figure 15:
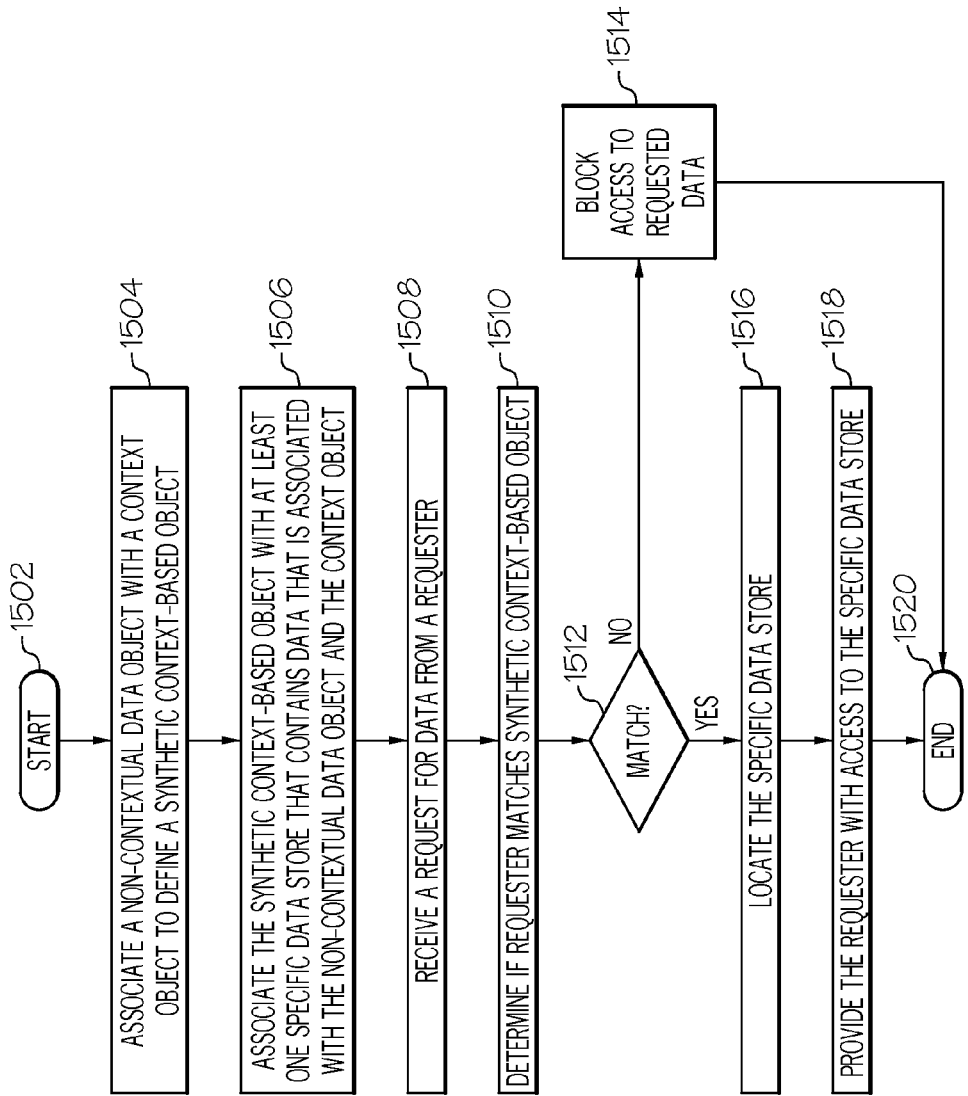
FIG. 15 is a high-level flow chart of one or more steps performed by a computer processor to secure data stores through the use of synthetic context-based objects.

With reference now to FIG. 15, a high-level flow chart of one or more steps performed by a computer processor to secure data stores through the use of synthetic context-based objects is presented. After initiator block 1502, a non-contextual data object is associated with a context object to define a synthetic context-based object (block 1504). As described herein, the non-contextual data object either ambiguously relates to multiple subject-matters, or it describes a data requester without providing any context to the data request. Standing alone, it is unclear as to which of these multiple-subject matters the data in the non-contextual data object is directed, and it is also unclear as to which data, if any, the data requester is authorized to access. However, as described herein, associating a first non-contextual data object with a first context object to define a first synthetic context-based object, where the first non-contextual data object ambiguously describes multiple types of persons, and where the first context object provides a circumstantial context, allows for the identification of a specific type of person from the multiple types of persons.

As described in block 1506, the synthetic context-based object is associated with at least one specific data store. This at least one specific data store contains data that is associated with data contained in the non-contextual data object and the context object. That is, the data in the data store may be identical to that found in the non-contextual data object and the context object; it may be synonymous to that found in the non-contextual data object and the context object; and/or it may simply be deemed related by virtue of a lookup table that has been previously created.

As described in block 1508, a request for data is received from a requester. This request includes both the type of data needed, as well as information describing the current circumstances of the data requester (e.g., using data entered in UI 1000 described above). As described herein, the circumstantial context of the data requester may be a current activity of the requester (and NOT a role of the data requester); a physical location of a computer being used, by the requester, to send the request to a security module that received the data request; a professional certification possessed by the requester; a time window within which data from said at least one specific data store must be returned to the requester; a length of time that the requester has been an employee of the enterprise that owns the data; whether the requester is a full time employee of the enterprise, a contract employee of the enterprise, or a non-employee of the enterprise; etc. In one embodiment, the circumstantial context of the requester is determined by data mining a database that describes current interests of the requester. In one embodiment, the circumstantial context of the requester is determined by data mining a database that describes an educational background of the requester.

In one embodiment, the terms in the data stores are identified by data mining a data structure in order to locate the data from the non-contextual data object and the context object in one or more data stores. Thus, this data mining locates at least one specific data store that contains data contained in the non-contextual data object and the context object.

In one embodiment, the data store is a text document. In this embodiment, the data mining entails searching the text document for text data that is part of the synthetic context-based object, and then associating the text document that contains this text data with the synthetic context-based object.

In one embodiment, the data store is a video file. In this embodiment, the data mining entails searching metadata associated with the video file for text data that is part of the synthetic context-based object, and then associating the video file having this metadata with the synthetic context-based object.

In one embodiment, the data store is a web page. In this embodiment, the data mining entails searching the web page for text data that is part of the synthetic context-based object, and then associating the web page that contains this text data with the synthetic context-based object.

Note that in one embodiment, the specific subject-matter for a particular data store in the data structure is exclusive to only that particular data store. That is, only one data store is mapped to a particular synthetic context-based object, such that there is a one-to-one relationship between each synthetic context-based object and each data store. Note further that in another embodiment, the specific subject-matter for a particular data store in the data structure overlaps at least one other data store. That is, multiple data stores are mapped to a particular synthetic context-based object, such that there is a one-to-many relationship between a particular synthetic context-based object and multiple data stores.

As described herein, the synthetic context-based object used to point to one or more data stores may be from a dimensionally constrained hierarchical synthetic context-based object library (e.g., vertical library 1404 in FIG. 14), which has been constructed for multiple synthetic context-based objects. As described herein, synthetic context-based objects within a same dimension of the dimensionally constrained hierarchical synthetic context-based object library share data from a same non-contextual data object, and synthetic context-based objects within the same dimension of the dimensionally constrained hierarchical synthetic context-based object library contain disparate data from different context objects.

As depicted in block 1510, a determination is then made (e.g., by security module 706) as to whether the context of a person requesting the data matches the synthetic context-based object that have been previously matched to a particular data store. That is, in one embodiment the security module will generate a user-based synthetic context-based object for the requester. This user-based synthetic context-based object is then compared to a previously generated synthetic context-based object that describes a context/circumstances of a requester when making the data request. If the two synthetic context-based objects to not match (query block 1512), then that data requester is blocked from accessing the data stores (block 1514). However, if the synthetic context-based objects match, then the appropriate specific data store is located (block 1516), and its data is provided to the requester (block 1518). The process ends at terminator block 1520.

Note that the security systems described herein using synthetic context-based objects to describe a data requester may be used in addition to, or in conjunction with, a pre-existing security system, which may be based on firewalls, passwords, roles, titles, etc. Again, note that the synthetic context-based objects for the data requesters, as described herein, ignore and do not use such firewalls, passwords, roles, titles, etc. That is, in one embodiment, security is provided by just the synthetic context-based objects described herein for the data requester, while in another embodiment security is provided by a combination of the synthetic context-based objects along with another security system.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method for securely accessing a specific data store, the processor-implemented method comprising:
   associating, by a security module having a processor, a first non-contextual data object with a first context object to define a first synthetic context-based object, wherein the first non-contextual data object describes multiple types of persons, wherein the first context object provides a context that identifies a specific type of person from the multiple types of persons, and wherein the first context object further describes a location of a computer that is being used by a requester of data as being a public Wi-Fi hot spot that provides the computer with access to a network;
   associating, by the security module, the first synthetic context-based object with at least one specific data store in a data structure;
   receiving, by the security module, a string of binary data that describes a request, from the requester, for data from said at least one specific data store in the data structure;
   determining, by the security module, the context according to a physical location of a computer being used, by the requester, to send the request to the security module;
   generating, by the security module, a new synthetic context-based object for the requester;

determining, by the security module, whether the new synthetic context-based object matches the first synthetic context-based object;

in response to determining that the new synthetic context-based object matches the first synthetic context-based object, the security module locating, via the first synthetic context-based object, said at least one specific data store;

providing, by the security module, the requester access to said at least one specific data store;

constructing, by the security module, a dimensionally constrained hierarchical synthetic context-based object library for multiple synthetic context-based objects, wherein synthetic context-based objects within a same dimension of the dimensionally constrained hierarchical synthetic context-based object library share data from a same non-contextual data object, and wherein synthetic context-based objects within the same dimension of the dimensionally constrained hierarchical synthetic context-based object library contain disparate data from different context objects;

receiving, from the requester, the request for data from at least one data store that is associated with synthetic context-based objects within the same dimension of the dimensionally constrained hierarchical synthetic context-based object library;

receiving, from the requester, a time window for receiving the data from said at least one data store that is associated with synthetic context-based objects within the same dimension of the dimensionally constrained hierarchical synthetic context-based object library, wherein the time window describes an amount of time that the requester of data is willing to wait for at least one data store that is associated with synthetic context-based objects within the same dimension of the dimensionally constrained hierarchical synthetic context-based object library;

determining, by the security module, a security level of the requester based on the time window received from the requester, wherein a longer time window is indicative of a higher security level for the requester than a relatively shorter time window;

matching, by the security module and based on the time window for the requester, the security level of the requester to data from said at least one specific data store that is associated with synthetic context-based objects within the same dimension of the dimensionally constrained hierarchical synthetic context-based object library; and returning, to the requester, data from said at least one specific data store that is associated with synthetic context-based objects within the same dimension of the dimensionally constrained hierarchical synthetic context-based object library and that matches the security level of the requester.

2. The processor-implemented method of claim 1, further comprising:

blocking, by the security module, the requester from accessing data stores other than said at least one specific data store in the data structure.

3. The processor-implemented method of claim 1, further comprising:

further determining, by the security module, the context according to a current activity of the requester, wherein the current activity is not based on a role or title of the requester.

4. The processor-implemented method of claim 1, further comprising:

further determining, by the security module, the context according to a professional certification possessed by the requester.

5. The processor-implemented method of claim 1, wherein said at least one specific data store is owned by an enterprise, and wherein the requester is an employee of the enterprise, and wherein the processor-implemented method further comprises:

further determining, by the security module, the context according to a length of time that the requester has been an employee of the enterprise.

6. The processor-implemented method of claim 1, wherein said at least one specific data store is owned by an enterprise, and wherein the processor-implemented method further comprises:

further determining, by the security module, the context according to whether the requester is a full time employee of the enterprise, a contract employee of the enterprise, or a non-employee of the enterprise.

7. The processor-implemented method of claim 1, further comprising:

further determining, by the security module, the context of the requester by data mining a database that describes current interests of the requester.

8. The processor-implemented method of claim 1, further comprising:

further determining, by the security module, the context of the requester by data mining a database that describes an educational background of the requester.

9. The processor-implemented method of claim 1, further comprising:

associating a second non-contextual data object with a second context object to define a second synthetic context-based object, wherein the second non-contextual data object relates to multiple subject-matters, and wherein the second context object provides a context that identifies a specific subject-matter, from the multiple subject-matters, of the second non-contextual data object;

associating the second synthetic context-based object with said at least one specific data store in the data structure;

associating the second synthetic context-based object with the first synthetic context-based object; and accessing, by the security module, said at least one specific data store by accessing the second synthetic context-based object via the first synthetic context-based object.

10. The processor-implemented method of claim 9, wherein said at least one specific data store is a text document, and wherein the processor-implemented method further comprises:

searching, by the security module, the text document for text data that is part of the second synthetic context-based object; and associating the text document that contains said text data with the second synthetic context-based object.

11. The processor-implemented method of claim 9, wherein said at least one specific data store is a video file, and wherein the processor-implemented method further comprises:

searching, by the security module, metadata associated with the video file for text data that is part of the second synthetic context-based object; and associating the video file having said metadata with the second synthetic context-based object.

12. The processor-implemented method of claim 9, wherein said at least one specific data store is a web page, and wherein the processor-implemented method further comprises:
  searching, by the security module, the web page for text data that is part of the second synthetic context-based object; and
  associating the web page that contains said text data with the second synthetic context-based object.

13. A computer program product for securing data stores, the computer program product comprising a non-transitory computer readable storage medium having program code embodied therewith, the program code readable and executable by a processor to perform a method comprising:
  associating, by a security module having one or more processors, a first non-contextual data object with a first context object to define a first synthetic context-based object, wherein the first non-contextual data object describes multiple types of persons, wherein the first context object provides a context that identifies a specific type of person from the multiple types of persons, and wherein the first context object further describes a location of a computer that is being used by a requester of data as being a public Wi-Fi hot spot that provides the computer with access to a network;
  associating, by the security module, the first synthetic context-based object with at least one specific data store in a data structure;
  receiving, by the security module, a string of binary data that describes a request, from the requester, for data from said at least one specific data store in the data structure;
  determining, by the security module, the context according to a physical location of a computer being used, by the requester, to send the request to the security module;
  generating, by the security module, a new synthetic context-based object for the requester;
  determining, by the security module, whether the new synthetic context-based object matches the first synthetic context-based object;
  in response to determining that the new synthetic context-based object matches the first synthetic context-based object, the security module locating, via the first synthetic context-based object, said at least one specific data store;
  providing, by the security module, the requester access to said at least one specific data store;
  constructing, by the security module, a dimensionally constrained hierarchical synthetic context-based object library for multiple synthetic context-based objects, wherein synthetic context-based objects within a same dimension of the dimensionally constrained hierarchical synthetic context-based object library share data from a same non-contextual data object, and wherein synthetic context-based objects within the same dimension of the dimensionally constrained hierarchical synthetic context-based object library contain disparate data from different context objects;
  receiving, from the requester, the request for data from at least one data store that is associated with synthetic context-based objects within the same dimension of the dimensionally constrained hierarchical synthetic context-based object library;
  receiving, from the requester, a time window for receiving the data from said at least one data store that is associated with synthetic context-based objects within the same dimension of the dimensionally constrained hierarchical synthetic context-based object library, wherein the time window describes an amount of time that the requester of data is willing to wait for at least one data store that is associated with synthetic context-based objects within the same dimension of the dimensionally constrained hierarchical synthetic context-based object library;
  determining, by the security module, a security level of the requester based on the time window received from the requester, wherein a longer time window is indicative of a higher security level for the requester than a relatively shorter time window;
  matching, by the security module and based on the time window for the requester, the security level of the requester to data from said at least one specific data store that is associated with synthetic context-based objects within the same dimension of the dimensionally constrained hierarchical synthetic context-based object library; and
  returning, to the requester, data from said at least one specific data store that is associated with synthetic context-based objects within the same dimension of the dimensionally constrained hierarchical synthetic context-based object library and that matches the security level of the requester.

14. The computer program product of claim 13, wherein the program code is further readable and executable by the processor for:
  blocking the requester from accessing any data store in the data structure other than said at least one specific data store.

15. The computer program product of claim 13, wherein the program code is further readable and executable by the processor for:
  further determining, by the security module, the context according to a current activity of the requester, wherein the current activity is not based on a role or title of the requester.

16. The computer program product of claim 13, wherein the program code is further readable and executable by the processor for:
  further determining, by the security module, the context according to a professional certification possessed by the requester.

17. The computer program product of claim 13, wherein the program code is further readable and executable by the processor for:
  further determining, by the security module, the context according to a time window within which data from said at least one specific data store must be returned to the requester.

18. The computer program product of claim 13, wherein the program code is further readable and executable by the processor for:
  further determining, by the security module, the context of the requester by data mining a database that describes current interests of the requester.

19. The computer program product of claim 13, wherein the program code is further readable and executable by the processor for:
  associating a second non-contextual data object with a second context object to define a second synthetic context-based object, wherein the second non-contextual data object relates to multiple subject-matters, and wherein the second context object provides a context that identifies a specific subject-matter, from the multiple subject-matters, of the second non-contextual data object;

associating the second synthetic context-based object with said at least one specific data store in the data structure;

associating the second synthetic context-based object with the first synthetic context-based object; and accessing, by the security module, said at least one specific data store by accessing the second synthetic context-based object via the first synthetic context-based object.

20. A processor-implemented method for securely accessing a specific data store, the processor-implemented method comprising:

associating, by a security module having a processor, a first non-contextual data object with a first context object to define a first synthetic context-based object, wherein the first non-contextual data object relates to multiple subject-matters and describes multiple types of persons, wherein the first context object provides a context that identifies a specific type of person from the multiple types of persons, and wherein the first context object further describes a location of a computer that is being used by a requester of data as being a public Wi-Fi hot spot that provides the computer with access to a network;

associating, by the security module, the first synthetic context-based object with at least one specific data store in a data structure;

receiving, by a security module, a string of binary data that describes the requester of data from said at least one specific data store in the data structure;

generating, by the security module, a new synthetic context-based object for the requester;

determining, by the security module, whether the new synthetic context-based object matches the first synthetic context-based object;

in response to determining that the new synthetic context-based object matches the first synthetic context-based object, the security module locating, via the first synthetic context-based object, said at least one specific data store;

providing, by the security module, the requester access to said at least one specific data store;

constructing, by the processor, a dimensionally constrained hierarchical synthetic context-based object library for multiple synthetic context-based objects, wherein synthetic context-based objects within a same dimension of the dimensionally constrained hierarchical synthetic context-based object library share data from a same non-contextual data object, and wherein synthetic context-based objects within the same dimension of the dimensionally constrained hierarchical synthetic context-based object library contain disparate data from different context objects;

receiving, from the requester, a request for at least one data store that is associated with synthetic context-based objects within the same dimension of the dimensionally constrained hierarchical synthetic context-based object library;

receiving, from the requester, a time window for receiving the data from said at least one data store that is associated with synthetic context-based objects within the same dimension of the dimensionally constrained hierarchical synthetic context-based object library, wherein the time window describes an amount of time that the requester of data is willing to wait for at least one data store that is associated with synthetic context-based objects within the same dimension of the dimensionally constrained hierarchical synthetic context-based object library;

determining, by the security module, a security level of the requester based on the time window received from the requester, wherein a longer time window is indicative of a higher security level for the requester than a relatively shorter time window;

matching, by the security module and based on the time window for the requester, the security level of the requester to data from said at least one specific data store that is associated with synthetic context-based objects within the same dimension of the dimensionally constrained hierarchical synthetic context-based object library; and returning, to the requester, data from said at least one specific data store that is associated with synthetic context-based objects within the same dimension of the dimensionally constrained hierarchical synthetic context-based object library and that matches the security level of the requester.

* * * * *